United States Patent
Ozturk et al.

(10) Patent No.: US 12,352,882 B2
(45) Date of Patent: Jul. 8, 2025

(54) METHOD, APPARATUS, AND SYSTEM FOR SPEECH ENHANCEMENT AND SEPARATION BASED ON AUDIO AND RADIO SIGNALS

(71) Applicants: Muhammed Zahid Ozturk, Beltsville, MD (US); Chenshu Wu, Hong Kong (CN); Beibei Wang, Clarksville, MD (US); K. J. Ray Liu, Potomac, MD (US); Oscar Chi-Lim Au, San Jose, CA (US)

(72) Inventors: Muhammed Zahid Ozturk, Beltsville, MD (US); Chenshu Wu, Hong Kong (CN); Beibei Wang, Clarksville, MD (US); K. J. Ray Liu, Potomac, MD (US); Oscar Chi-Lim Au, San Jose, CA (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 17/827,902

(22) Filed: May 30, 2022

(65) Prior Publication Data
US 2022/0291328 A1    Sep. 15, 2022

Related U.S. Application Data

(63) Continuation-in-part of application No. 15/326,112, filed as application No. PCT/US2015/041037 on Jul.
(Continued)

(51) Int. Cl.
*G01S 5/06* (2006.01)
*G01S 5/02* (2010.01)

(52) U.S. Cl.
CPC .............. *G01S 5/06* (2013.01); *G01S 5/0226* (2013.01); *G01S 5/0252* (2013.01); *G01S 5/0273* (2013.01)

(58) Field of Classification Search
CPC ........ G01S 5/06; G01S 5/0226; G01S 5/0252; G01S 5/0273
See application file for complete search history.

(56) References Cited

U.S. PATENT DOCUMENTS 5,103,233 A  *  4/1992  Gallagher  .............  G01S 13/426
                                                                    342/158
5,229,775 A  *  7/1993  Sakamoto  ...............  G01S 13/28
                                                                    342/201
(Continued)

FOREIGN PATENT DOCUMENTS

CN      111667844     *  9/2020   .........  G10L 21/0208
JP      2001154688    *  6/2001   .............  B06R 16/02

*Primary Examiner* — Zhiyu Lu

(57) ABSTRACT

Methods, apparatus and systems for radio-assisted signal estimation are described. In one example, a described system comprises: a sensor configured to obtain a baseband mixture signal in a venue; a transmitter configured to transmit a first radio signal through a wireless channel of the venue; a receiver configured to receive a second radio signal through the wireless channel; and a processor. The baseband mixture signal comprises a mixture of a first source signal and an additional signal. The first source signal is generated by a first motion of a first object in the venue. The second radio signal differs from the first radio signal due to the wireless channel and at least the first motion of the first object in the venue. The processor is configured for: obtaining a radio feature of the second radio signal, constructing a first adaptive filter for the baseband mixture signal based on the radio feature, filtering the baseband mixture signal
(Continued)

using the first adaptive filter to obtain a first output signal, and generating an estimation of the first source signal based on the first output signal.

25 Claims, 23 Drawing Sheets

Related U.S. Application Data 17, 2015, now abandoned, application No. 17/827,902, filed on May 30, 2022 is a continuation-in-part of application No. 16/127,151, filed on Sep. 10, 2018, now Pat. No. 11,012,285, and a continuation-in-part of application No. 16/790,610, filed on Feb. 13, 2020, now Pat. No. 11,928,894, and a continuation-in-part of application No. 16/790,627, filed on Feb. 13, 2020, now Pat. No. 11,397,258, and a continuation-in-part of application No. 16/798,343, filed on Feb. 22, 2020, now Pat. No. 11,340,345, and a continuation-in-part of application No. 16/871,000, filed on May 10, 2020, now Pat. No. 11,500,056, and a continuation-in-part of application No. 16/871,004, filed on May 10, 2020, now Pat. No. 12,046,040, and a continuation-in-part of application No. 16/871,006, filed on May 10, 2020, now Pat. No. 11,408,978, and a continuation-in-part of application No. 16/909,913, filed on Jun. 23, 2020, now abandoned, and a continuation-in-part of application No. 16/909,940, filed on Jun. 23, 2020, now Pat. No. 11,391,830, and a continuation-in-part of application No. 16/945,827, filed on Aug. 1, 2020, now Pat. No. 11,444,710, and a continuation-in-part of application No. 16/945,837, filed on Aug. 1, 2020, now Pat. No. 11,439,344, and a continuation-in-part of application No. 17/019,270, filed on Sep. 13, 2020, now Pat. No. 12,036,948, and a continuation-in-part of application No. 17/113,023, filed on Dec. 5, 2020, now Pat. No. 11,770,197, and a continuation-in-part of application No. 17/149,625, filed on Jan. 14, 2021, and a continuation-in-part of application No. 17/149,667, filed on Jan. 14, 2021, now abandoned, and a continuation-in-part of application No. 17/180,763, filed on Feb. 20, 2021, now Pat. No. 11,592,913, which is a continuation-in-part of application No. 16/798,343, filed on Feb. 22, 2020, now Pat. No. 11,340,345, which is a continuation-in-part of application No. 16/798,337, filed on Feb. 22, 2020, now Pat. No. 10,845,463, application No. 17/827,902, filed on May 30, 2022 is a continuation-in-part of application No. 17/180,762, filed on Feb. 20, 2021, now Pat. No. 11,531,087, and a continuation-in-part of application No. 17/180,760, filed on Feb. 20, 2021, now Pat. No. 11,181,486, and a continuation-in-part of application No. 17/180,766, filed on Feb. 20, 2021, now Pat. No. 11,953,618, and a continuation-in-part of application No. 17/214,838, filed on Mar. 27, 2021, now Pat. No. 11,340,328, and a continuation-in-part of application No. 17/214,841, filed on Mar. 27, 2021, now Pat. No. 11,500,058, and a continuation-in-part of application No. 17/214,836, filed on Mar. 27, 2021, now Pat. No. 11,500,057, and a continuation-in-part of application No. 17/352,185, filed on Jun. 18, 2021, now Pat. No. 11,906,659, and a continuation-in-part of application No. 17/352,306, filed on Jun. 20, 2021, now Pat. No. 11,940,550, and a continuation-in-part of application No. 17/492,599, filed on Oct. 2, 2021, now Pat. No. 11,448,727, and a continuation-in-part of application No. 17/492,598, filed on Oct. 2, 2021, now Pat. No. 11,448,728, and a continuation-in-part of application No. 17/537,432, filed on Nov. 29, 2021, and a continuation-in-part of application No. 17/539,058, filed on Nov. 30, 2021, now Pat. No. 12,066,572, and a continuation-in-part of application No. 17/540,156, filed on Dec. 1, 2021.

(60) Provisional application No. 63/209,907, filed on Jun. 11, 2021, provisional application No. 63/235,103, filed on Aug. 19, 2021, provisional application No. 63/253,083, filed on Oct. 6, 2021, provisional application No. 63/276,652, filed on Nov. 7, 2021, provisional application No. 63/281,043, filed on Nov. 18, 2021, provisional application No. 63/293,065, filed on Dec. 22, 2021, provisional application No. 63/300,432, filed on Jan. 18, 2022, provisional application No. 63/308,927, filed on Feb. 10, 2022, provisional application No. 63/332,658, filed on Apr. 19, 2022.

(56) References Cited

U.S. PATENT DOCUMENTS

| | | | | |
|---|---|---|---|---|
| 5,309,161 | A * | 5/1994 | Urkowitz | G01S 13/288 342/111 |
| 5,323,162 | A * | 6/1994 | Fujisaka | G01S 13/9029 342/25 B |
| 10,725,175 | B2 * | 7/2020 | Sahin | G01S 15/8979 |
| 2005/0197070 | A1 * | 9/2005 | Kaikuranta | G01W 1/16 455/67.13 |
| 2007/0123323 | A1 * | 5/2007 | Zhu | H04M 1/6025 455/575.2 |
| 2008/0077015 | A1 * | 3/2008 | Boric-Lubecke | G01S 13/888 600/453 |
| 2014/0270187 | A1 * | 9/2014 | Hall | H04S 5/00 381/17 |
| 2014/0270188 | A1 * | 9/2014 | Hall | H04S 5/00 381/17 |
| 2019/0265345 | A1 * | 8/2019 | Jungmaier | H04R 1/342 |
| 2020/0132836 | A1 * | 4/2020 | Sahin | G01S 7/006 |
| 2021/0383795 | A1 * | 12/2021 | Li | G10L 15/08 |
| 2022/0116723 | A1 * | 4/2022 | Hall | H04S 7/303 |

* cited by examiner

METHOD, APPARATUS, AND SYSTEM FOR SPEECH ENHANCEMENT AND SEPARATION BASED ON AUDIO AND RADIO SIGNALS

CROSS-REFERENCE TO RELATED APPLICATIONS

The present application hereby incorporates by reference the entirety of the disclosures of, and claims priority to, each of the following cases:
(a) U.S. patent application Ser. No. 15/326,112, entitled "WIRELESS POSITIONING SYSTEMS", filed on Jan. 13, 2017,
   (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
   (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/790,610, entitled "METHOD, APPARATUS, AND SYSTEM FOR WIRELESS GAIT RECOGNITION", filed Feb. 13, 2020,
(d) U.S. patent application Ser. No. 16/790,627, entitled "METHOD, APPARATUS, AND SYSTEM FOR OUTDOOR TARGET TRACKING", filed Feb. 13, 2020.
(e) U.S. patent application Ser. No. 16/798,343, entitled "METHOD, APPARATUS, AND SYSTEM FOR WIRELESS OBJECT TRACKING", filed Feb. 22, 2020,
(f) U.S. patent application Ser. No. 16/871,000, entitled "METHOD, APPARATUS, AND SYSTEM FOR WIRELESS TRACKING WITH GRAPH-BASED PARTICLE FILTERING", filed on May 10, 2020,
(g) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(h) U.S. patent application Ser. No. 16/871,006, entitled "METHOD, APPARATUS, AND SYSTEM FOR VITAL SIGNS MONITORING USING HIGH FREQUENCY WIRELESS SIGNALS", filed on May 10, 2020,
(i) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
(j) U.S. patent application Ser. No. 16/909,940, entitled "METHOD, APPARATUS, AND SYSTEM FOR QUALIFIED WIRELESS SENSING", filed on Jun. 23, 2020,
(k) U.S. patent application Ser. No. 16/945,827, entitled "METHOD, APPARATUS, AND SYSTEM FOR PROCESSING AND PRESENTING LIFE LOG BASED ON A WIRELESS SIGNAL", filed on Aug. 1, 2020,
(l) U.S. patent application Ser. No. 16/945,837, entitled "METHOD, APPARATUS, AND SYSTEM FOR WIRELESS SLEEP MONITORING", filed on Aug. 1, 2020,
(m) U.S. patent application Ser. No. 17/019,270, entitled "METHOD, APPARATUS, AND SYSTEM FOR VEHICLE WIRELESS MONITORING", filed on Sep. 13, 2020,
(n) U.S. patent application Ser. No. 17/113,023, entitled "METHOD, APPARATUS, AND SYSTEM FOR ACCURATE WIRELESS MONITORING", filed on Dec. 5, 2020,
(o) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
(p) U.S. patent application Ser. No. 17/149,667, entitled "METHOD, APPARATUS, AND SYSTEM FOR WIRELESS MONITORING WITH FLEXIBLE POWER SUPPLY", filed on Jan. 14, 2021,
(q) U.S. patent application Ser. No. 17/180,763, entitled "METHOD, APPARATUS, AND SYSTEM FOR WIRELESS WRITING TRACKING", filed on Feb. 20, 2021,
   (1) which is a Continuation-in-Part of U.S. patent application Ser. No. 16/798,343, entitled "METHOD, APPARATUS, AND SYSTEM FOR WIRELESS OBJECT TRACKING", filed on Feb. 22, 2020,
      a. which is a Continuation-in-Part of U.S. patent application Ser. No. 16/798,337, entitled "METHOD, APPARATUS, AND SYSTEM FOR WIRELESS OBJECT SCANNING", filed Feb. 22, 2020, issued as U.S. Pat. No. 10,845,463 on Nov. 24, 2020,
(r) U.S. patent application Ser. No. 17/180,762, entitled "METHOD, APPARATUS, AND SYSTEM FOR FALL-DOWN DETECTION BASED ON A WIRELESS SIGNAL", filed on Feb. 20, 2021,
(s) U.S. patent application Ser. No. 17/180,760, entitled "METHOD, APPARATUS, AND SYSTEM FOR WIRELESS MATERIAL SENSING", filed on Feb. 20, 2021,
(t) U.S. patent application Ser. No. 17/180,766, entitled "METHOD, APPARATUS, AND SYSTEM FOR WIRELESS MOTION RECOGNITION", filed on Feb. 20, 2021,
(u) U.S. patent application Ser. No. 17/214,838, entitled "METHOD, APPARATUS, AND SYSTEM FOR WIRELESS VITAL MONITORING USING HIGH FREQUENCY SIGNALS", filed on Mar. 27, 2021,
(v) U.S. patent application Ser. No. 17/214,841, entitled "METHOD, APPARATUS, AND SYSTEM FOR WIRELESS PROXIMITY SENSING", filed on Mar. 27, 2021,
(w) U.S. patent application Ser. No. 17/214,836, entitled "METHOD, APPARATUS, AND SYSTEM FOR WIRELESSLY TRACKING KEYSTROKES", filed on Mar. 27, 2021,
(x) U.S. Provisional Patent application 63/209,907, entitled "METHOD, APPARATUS, AND SYSTEM FOR WIRELESS MOTION AND SOUND SENSING", filed on Jun. 11, 2021, (y) U.S. patent application Ser. No. 17/352,185, entitled "METHOD, APPARATUS, AND SYSTEM FOR WIRELESS MICRO MOTION MONITORING", filed on Jun. 18, 2021, (z) U.S. patent application Ser. No. 17/352,306, entitled "METHOD, APPARATUS, AND SYSTEM FOR WIRELESS MONITORING TO ENSURE SECURITY", filed on Jun. 20, 2021, (aa) U.S. Provisional Patent application 63/235,103, entitled "METHOD, APPARATUS, AND SYSTEM FOR NAMING IOT DEVICES FOR WIRELESS SENSING", filed on Aug. 19, 2021, (bb) U.S. Provisional Patent application 63/253,083, entitled "METHOD, APPARATUS, AND SYSTEM FOR WIRELESS SENSING, DETECTION AND TRACKING", filed on Oct. 6, 2021, (cc) U.S. patent application Ser. No. 17/492,599, entitled "METHOD, APPARATUS, AND SYSTEM FOR HUMAN RECOGNITION BASED ON GAIT FEATURES", filed on Oct. 2, 2021, (dd) U.S. patent application Ser. No. 17/492,598, entitled "METHOD, APPARATUS, AND SYSTEM FOR SOUND SENSING BASED ON WIRELESS SIGNALS", filed on Oct. 2, 2021, (ee) U.S. Provisional Patent application 63/276,652, entitled "METHOD, APPARATUS, AND SYSTEM FOR WIRELESSLY MONITORING VITAL SIGN AND PERIODIC MOTIONS", filed on Nov. 7, 2021, (ff) U.S. Provisional Patent application 63/281,043, entitled "METHOD, APPARATUS, AND SYSTEM FOR SENSING", filed on Nov. 18, 2021, (gg) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021, (hh) U.S. patent application Ser. No. 17/539,058, entitled "METHOD, APPARATUS, AND SYSTEM FOR HUMAN IDENTIFICATION BASED ON HUMAN RADIO BIOMETRIC INFORMATION", filed on Nov. 30, 2021, (ii) U.S. patent application Ser. No. 17/540,156, entitled "METHOD, APPARATUS, AND SYSTEM FOR POSITIONING AND POWERING A WIRELESS MONITORING SYSTEM", filed on Dec. 1, 2021, (jj) U.S. Provisional Patent application 63/293,065, entitled "METHOD, APPARATUS, AND SYSTEM FOR SPEECH ENHANCEMENT AND SEPARATION", filed on Dec. 22, 2021, (kk) U.S. Provisional Patent application 63/300,432, entitled "METHOD, APPARATUS, AND SYSTEM FOR WIRELESS SENSING AND SLEEP TRACKING", filed on Jan. 16, 2022, (ll) U.S. Provisional Patent application 63/308,927, entitled "METHOD, APPARATUS, AND SYSTEM FOR WIRELESS SENSING BASED ON MULTIPLE GROUPS OF WIRELESS DEVICES", filed on Feb. 19, 2022, (mm) U.S. Provisional Patent application 63/332,658, entitled "METHOD, APPARATUS, AND SYSTEM FOR WIRELESS SENSING", filed on Apr. 19, 2022.

TECHNICAL FIELD

The present teaching generally relates to sound sensing. More specifically, the present teaching relates to speech enhancement and separation based on both audio and radio signals.

BACKGROUND

Humans are enormously capable of understanding a noisy speech (a.k.a. speech enhancement (SE)) or separating one speaker from another (a.k.a. speech separation (SS)), which may be collectively called SES, and is known as a cocktail party problem. SES capability for machines is of great demand for many applications, such as voice commands, live speech recording, etc., yet remains a challenging problem using microphones.

Monaural SES methods achieved remarkable progress in recent years with the help of deep learning, especially when there is not much background noise. However, fundamental problems still exist in estimating the number of sources in a mixture, associating output sources with the desired speakers (a.k.a. label permutation problem), and tracing the speakers for long periods of time. Although these problems can be solved for clean mixtures, by clustering-based methods and permutation invariant training (PIT), their performance can decrease with noisy mixtures. Overall, audio-only approaches suffer from these ill-posed problems inherently.

To overcome the problems and enhance SES, multimodal systems have been introduced to exploit readily available information beyond audio, such as video. Similar to human perception, which also uses lip motion and facial information, audiovisual systems are shown to improve SES performance, especially in challenging cases, such as same-speaker mixtures. Same and similar-speaker mixtures are especially difficult for audio-only methods, as the distinction between the two sources is minimal. Additional visual information about the speaker, e.g., videos or even a facial picture of the user, or other information, such as voice activity detection, or pitch improves the SES performance. However, camera-based methods require good lighting conditions and raise potential privacy concerns.

SUMMARY

The present teaching generally relates to sound sensing. More specifically, the present teaching relates to speech enhancement and separation based on both audio and radio signals.

In one embodiment, a system for radio-assisted signal estimation is described. The system comprises: a sensor configured to obtain a baseband mixture signal in a venue; a transmitter configured to transmit a first radio signal through a wireless channel of the venue; a receiver configured to receive a second radio signal through the wireless channel; and a processor. The baseband mixture signal comprises a mixture of a first source signal and an additional signal. The first source signal is generated by a first motion of a first object in the venue. The second radio signal differs from the first radio signal due to the wireless channel and at least the first motion of the first object in the venue. The processor is configured for: obtaining a radio feature of the second radio signal, constructing a first adaptive filter for the baseband mixture signal based on the radio feature, filtering the baseband mixture signal using the first adaptive filter to obtain a first output signal, and generating an estimation of the first source signal based on the first output signal.

In another embodiment, a method for radio-assisted signal estimation is described. The method comprises: obtaining a baseband mixture signal in a venue, wherein the baseband mixture signal comprises a mixture of a first source signal and an additional signal, wherein the first source signal is generated by a first motion of a first object in the venue; obtaining a radio feature of a radio signal transmitted from a transmitter to a receiver in the venue, wherein the received radio signal differs from the transmitted radio signal due to a wireless channel of the venue and at least the first motion of the first object in the venue; constructing a first adaptive filter for the baseband mixture signal based on the radio feature; filtering the baseband mixture signal using the first adaptive filter to obtain a first output signal; and generating an estimation of the first source signal based on the first output signal.

Other concepts relate to software for implementing the present teaching on radio-assisted signal estimation. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
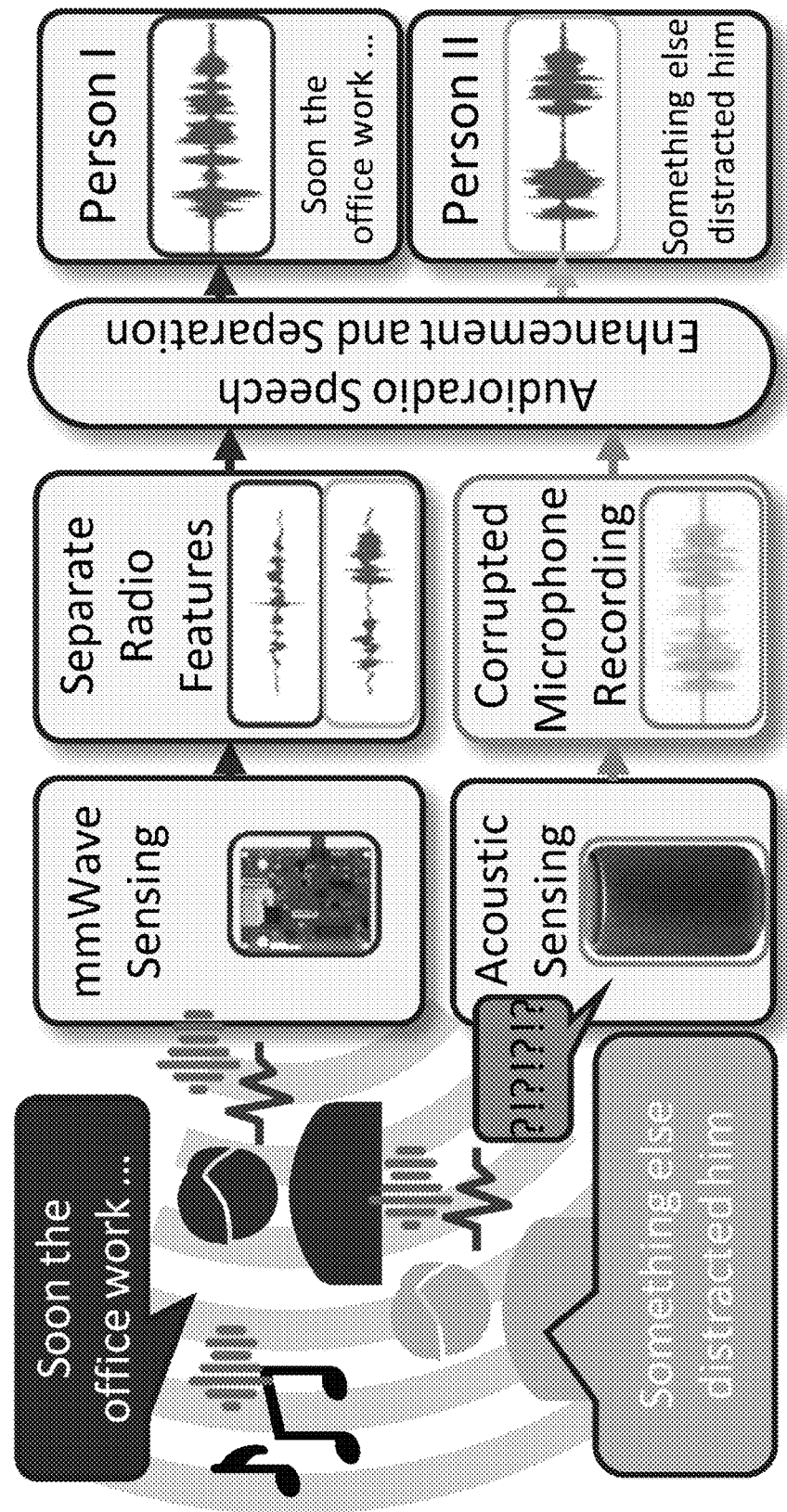
FIG. 1 illustrates an overview of a speech enhancement and separation system using audio and radio signals, according to some embodiments of the present disclosure.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a retraining, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated.

There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object.

The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.).

For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X−Y), (Y−X), abs(X−Y), $X^a$, $Y^b$, $abs(X^a - Y^b)$, $(X-Y)^a$, (X/Y), (X+a)/(Y+b), $(X^a/Y^b)$, and $((X/Y)^a - b)$, wherein a and b are may be some predetermined quantities. For example, the function may simply be abs(X−Y), or $(X-Y)^2$, $(X-Y)^4$. The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that $X=(x\_1, x\_2, \ldots, x\_n)$ and $Y=(y\_1, y\_2, \ldots, y\_n)$. The function may be a function of at least one of: $x\_i$, $y\_i$, $(x\_i - y\_i)$, $(y\_i - x\_i)$, $abs(x\_i - y\_i)$, $x\_i^a$, $y\_i^b$, $abs(x\_i^a - y\_i^b)$, $(x\_i - y\_i)^a$, $(x\_i/y\_i)$, $(x\_i + a)/(y\_i + b)$, $(x\_i^a/y\_i^b)$, and $((x\_i/y\_i)^a - b)$, wherein i is a component index of the n-tuple X and Y, and $1 <= i <= n$, e.g. component index of $x\_1$ is i=1, component index of $x\_2$ is i=2. The function may comprise a component-by-component summation of another function of at least one of the following: $x\_i$, $y\_i$, $(x\_i - y\_i)$, $(y\_i - x\_i)$, $abs(x\_i - y\_i)$, $x\_i^a$, $y\_i^b$, $abs(x\_i^a - y\_i^b)$, $(x\_i - y\_i)^a$, $(x\_i/y\_i)$, $(x\_i + a)/(y\_i + b)$, $(x\_i^a/y\_i^b)$, and $((x\_i/y\_i)^a - b)$, wherein i is the component index of the n-tuple X and Y. For example, the function may be in a form of sum $\{i=1\}^n$ $(abs(x\_i/y\_i) - 1)/n$, or sum $\{i=1\}^n$ $w\_i * (abs(x\_i/y\_i) - 1)$, where $w\_i$ is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i^{\{th\}}$ domain item is mapped to the $j^{\{th\}}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, ... ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier.

The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

Channel/Channel Information/Venue/Spatial-Temporal Info/Motion/Object

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information (including feedback or steering matrices generated by wireless communication devices, according to a standardized process, e.g., IEEE 802.11 or another standard), transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI).

The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, L_1 norm, L_2 norm, L_k norm for k>2, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car).

The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state.

The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.).

The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Washington Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface (UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

Type 1 device (transmitter, or Tx) and Type 2 device (receiver, or Rx) may be on same device (e.g. RF chip/IC) or simply the same device. The devices may operate at high frequency band, such as 28 GHz, 60 GHz, 77 GHz, etc. The RF chip may have dedicated Tx antennas (e.g. 32 antennas) and dedicated Rx antennas (e.g. another 32 antennas).

One Tx antenna may transmit a wireless signal (e.g. a series of probe signal, perhaps at 100 Hz). Alternatively, all Tx antennas may be used to transmit the wireless signal with beamforming (in Tx), such that the wireless signal is focused in certain direction (e.g. for energy efficiency or boosting the signal to noise ratio in that direction, or low power operation when "scanning" that direction, or low power operation if object is known to be in that direction).

The wireless signal hits an object (e.g. a living human lying on a bed 4 feet away from the Tx/Rx antennas, with breathing and heart beat) in a venue (e.g. a room). The object motion (e.g. lung movement according to breathing rate, or blood-vessel movement according to heart beat) may impact/modulate the wireless signal. All Rx antennas may be used to receive the wireless signal.

Beamforming (in Rx and/or Tx) may be applied (digitally) to "scan" different directions. Many directions can be scanned or monitored simultaneously. With beamforming, "sectors" (e.g. directions, orientations, bearings, zones, regions, segments) may be defined related to the Type 2 device (e.g. relative to center location of antenna array). For each probe signal (e.g. a pulse, an ACK, a control packet, etc.), a channel information or CI (e.g. channel impulse response/CIR, CSI, CFR) is obtained/computed for each sector (e.g. from the RF chip). In breathing detection, one may collect CIR in a sliding window (e.g. 30 sec, and with 100 Hz sounding/probing rate, one may have 3000 CIR over 30 sec).

The CIR may have many taps (e.g. N1 components/taps). Each tap may be associated with a time lag, or a time-of-flight (tof, e.g. time to hit the human 4 feet away and back). When a person is breathing in a certain direction at a certain distance (e.g. 4 ft), one may search for the CIR in the "certain direction". Then one may search for the tap corresponding to the "certain distance". Then one may compute the breathing rate and heart rate from that tap of that CIR.

One may consider each tap in the sliding window (e.g. 30 second window of "component time series") as a time function (e.g. a "tap function", the "component time series"). One may examine each tap function in search of a strong periodic behavior (e.g. corresponds to breathing, perhaps in the range of 10 bpm to 40 bpm).

The Type 1 device and/or the Type 2 device may have external connections/links and/or internal connections/links. The external connections (e.g. connection 1110) may be associated with 2G/2.5G/3G/3.5G/4G/LTE/5G/6G/7G/NBIoT, UWB, WiMax, Zigbee, 802.16 etc. The internal connections (e.g., 1114A and 1114B, 1116, 1118, 1120) may be associated with WiFi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/ standard.

The Type 1 device and/or Type 2 device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiMH battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, invertor, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bulldozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc.), the Type 1 device and/or Type 2 device may be an embedded device embedded in the vehicle, or an add-on device (e.g. aftermarket device) plugged into a port in the vehicle (e.g. OBD port/socket, USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle). The two devices may jointly monitor the passengers including children/babies in the car. They may be used to count the passengers, recognize the driver, detect presence of passenger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, parking ticket, golf cart, bicycle, smart phone, tablet, camera, recording device, smart watch, roller skate, shoes, jackets, goggle, hat, eye-wear, wearable, Segway, scooter, luggage tag, cleaning machine, vacuum cleaner, pet tag/collar/wearable/implant), each device either plugged into 12V accessory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-storey parking facility, scattered locations to cover a big area such as factory/stadium/train station/shopping mall/construction site. The Type A device may be located, tracked or monitored based on the TSCI.

The area/venue may have no local connectivity, e.g., broadband services, WiFi, etc. The Type 1 and/or Type 2 device may be portable. The Type 1 and/or Type 2 device may support plug and play.

Pairwise wireless links may be established between many pairs of devices, forming the tree structure. In each pair (and the associated link), a device (second device) may be a non-leaf (Type B). The other device (first device) may be a leaf (Type A or Type B) or non-leaf (Type B). In the link, the first device functions as a bot (Type 1 device or a Tx device) to send a wireless signal (e.g. probe signal) through the wireless multipath channel to the second device. The second device may function as an Origin (Type 2 device or Rx device) to receive the wireless signal, obtain the TSCI and compute a "linkwise analytics" based on the TSCI.

Speech enhancement and separation have been a long-standing problem, despite recent advances using a single microphone. Although microphones perform well in constrained settings, their performance for speech separation decreases in noisy conditions. The present teaching discloses RadioSES, an audio-radio speech enhancement and separation system that overcomes inherent problems in audio-only systems. By fusing a complementary radio modality, RadioSES can estimate the number of speakers, solve source association problem, separate, and enhance noisy mixture speeches, and improve both intelligibility and perceptual quality. The system can perform millimeter wave sensing to detect and localize speakers and introduce an audio-radio deep learning framework to fuse the separate radio features with the mixed audio features. Extensive experiments using commercial off-the-shelf devices show that RadioSES outperforms a variety of state-of-the-art baselines, with consistent performance gains in different environmental settings. Compared with the audiovisual methods, RadioSES provides similar improvements, along with the benefits of lower computational complexity and being less privacy concerning.

The disclosed RadioSES system addresses the SES problem by jointly leveraging millimeter-wave (mmWave) sensing as an orthogonal radio modality. Compared to cameras, radio devices have lower power, can operate in dark, through-wall settings and are less privacy-invasive. The radio reflections from speakers can not only allow separation of multiple speakers but also capture articulatory motions for SES. The reasons to select mmWave radios are two-fold: On the one hand, more and more smart devices now include an mmWave radar and a microphone, such as Google Soli phone and Nest Hub, Amazon Alexa, etc. and mmWave sensing promises to be more ubiquitous in the future. On the other hand, mmWave sensing has enabled many applications related to motion and vibration, such as heart rate monitoring, measuring machinery and object vibration, or extracting vocal folds vibration. In particular, it has been used to estimate pitch and detect voice activity, reconstruct speech to some extent, as well as enhance speech recognition for a single speaker. Yet no existing work has explored utilizing both modalities for joint SES tasks.

With this motivation, an audio-radio speech enhancement and separation system, RadioSES, is developed to solve the aforementioned problems and improve the overall performance. Building an audio-radio SES system faces multiple challenges. First, in order to solve the number of sources problem, a robust and efficient source detection and tracking method is needed, as the performance of a system can decrease significantly in the event of miss detection. Second, radio signals are usually prone to environmental effects, and their performance can decrease considerably when tested at a new location. Returned signals from the objects are not only affected by vibration, but also from motion, with motion usually being the stronger effect. Third, different from the rich literature in audiovisual deep learning methods, radio modality has not been explored in the context of SES. Designing a suitable and efficient deep learning model for practical applications is non-trivial. Last, deep learning systems require extensive data collection and robust training methods, which is especially challenging for radio signals.

The disclosed RadioSES system can overcome these challenges. As illustrated in FIG. 1, the RadioSES system 100 can detect, localize, and estimate the number of sources in an environment and improve SES performance even in unseen/challenging conditions. To achieve robust detection and localization, the system can use a computationally efficient pipeline of signal processing that can extract the radio features for speakers separately. In addition, the system can use an audio-radio deep learning framework that takes both audio signals and radio signals as the inputs and outputs separated and enhanced speeches for each of the speakers. Following recent advances in monaural SES, a deep learning module, called RadioSESNet, utilizes adaptive encoders, instead of relying on classical Short-Term Fourier Transform (STFT) representation. The RadioSES system further introduces a variety of techniques learned from audiovisual SES to improve robustness and generalizability of RadioSESNet to unseen environments and users.

In some embodiments, one can evaluate RadioSES using a commercial off-the-shelf (COTS) mmWave radar using synthetic and real-world data. In some embodiments, to boost data collection for training, one can build a data collection platform, and capture 5700 sentences from 19 users. In some embodiments, test results show that the radio modality can complement audio and bring similar improvements to that of video modality while not imposing visual privacy issues. One can extensively test RadioSES in different number of mixtures and a variety of environmental settings. When compared to the state-of-the art audio-only method (e.g., DPRNN-TasNet), RadioSES can bring around 3 dB improvements for separating noisy mixtures, along with benefits of estimating the number of sources and associating output streams. The improvements are not only in terms of SDR, but also of intelligibility and perceptual quality. In some embodiments, the test results indicate that audio-radio methods have a tremendous potential for SES tasks, as they enable a low-complexity, effective, privacy-preserving alternative to audio-only or vision-based methods. As such, RadioSES explores an important step in this direction and will inspire follow-up research.

The present teaching discloses RadioSES, a novel audio-radio system that jointly leverages mmWave radio and audio signals for simultaneous speech enhancement and separation. The present teaching introduces an audio-radio deep learning framework that fuses audio signals and radio signals for multi-modal speech separation and enhancement. The present teaching builds an extensive audio-radio dataset and compares RadioSES's performance in various conditions with state-of-the-art methods. In some examples, RadioSES achieves 3 to 6 dB SiSDR improvements in separating two and three person mixtures, respectively.

In some embodiments, RadioSES requires a device with mmWave sensing capabilities, and a microphone. For example, a monaural microphone records ambient sound, and a mmWave radar is expected to output separate streams for each sound source, where speech signals are investigated. While it is possible to place radar in a separate location, one can assume the radar and microphone are co-located. In some embodiments, one can expect the speaking objects to be in front of the radar. In addition, although radars can sense in NLOS conditions, one can investigate LOS only in some embodiments. For example, the application scenarios of RadioSES can be one or more persons speaking in front of a computer, smart hub, or a phone, with LOS.

In some embodiments, having speaking persons in the field-of-view (FoV), RadioSES detects near stationary bodies and uses the output to estimate and associate sources with the extracted sound signals. Unlike microphone arrays, using mmWave sensing enables to capture individual data streams not only from different azimuth angles, but also from varying distances. After these tasks, an efficient multimodal deep learning module may be used to estimate the clean speech(es), which can be used as clean speech or passed through a speech-to-text engine to convert into commands.

Figure 2:
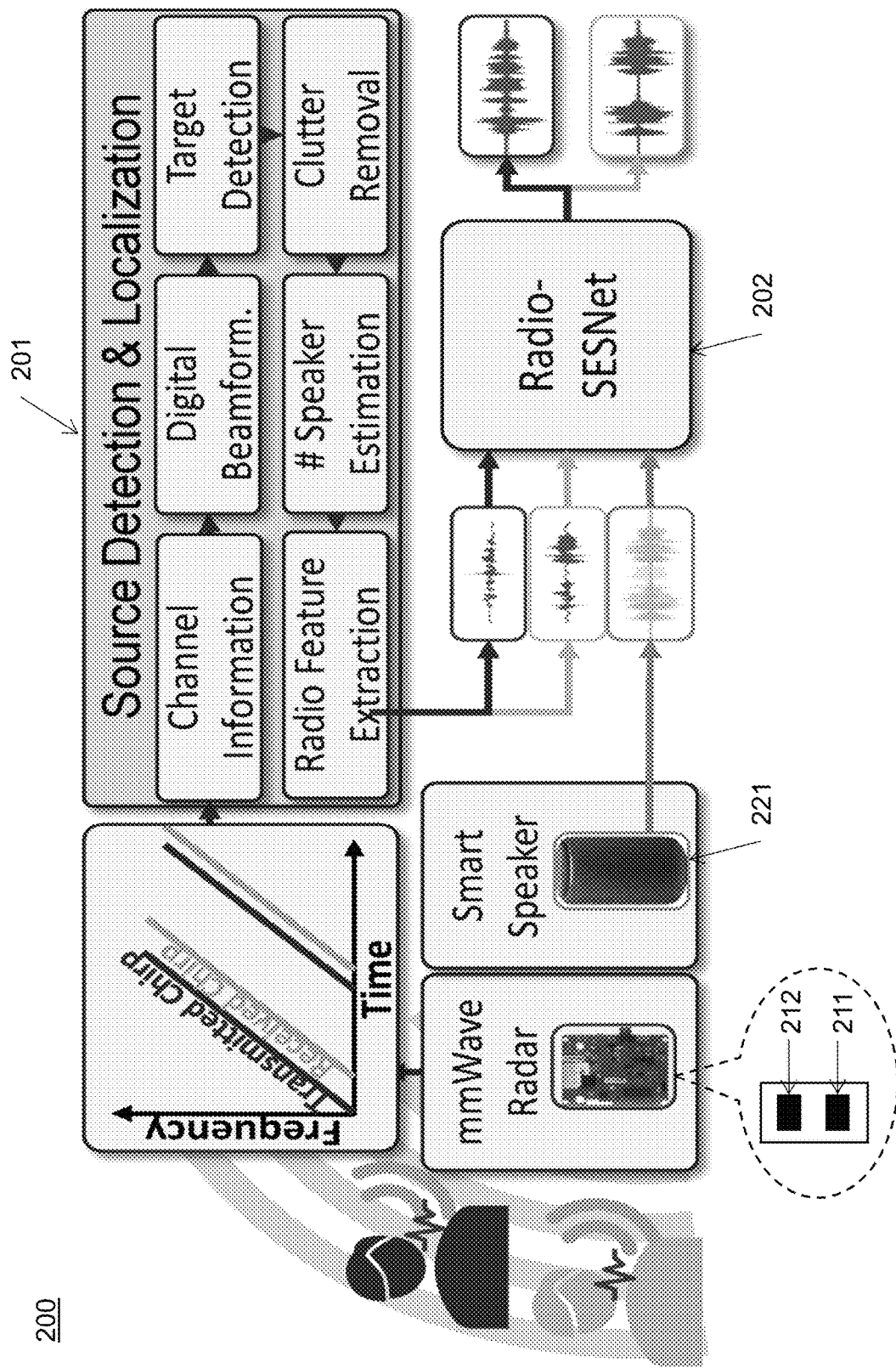
FIG. 2 illustrates an exemplary block diagram of a speech enhancement and separation system, according to some embodiments of the present disclosure.

As shown in FIG. 2, the RadioSES system 200 includes: an mmWave radar, a smart speaker 211, a first block 201 for source detection and localization, and a second block 202 for deep learning module, named RadioSESNet.

In some embodiments, as shown in FIG. 2, the mmWave radar can include a device with a transmitter (Tx) antenna array 211 and a receiver (Rx) antenna array 212. In some embodiments, each of the transmitter (Tx) and receiver (Rx) arrays has multiple antennas. To sense sound in the environment, the Tx 211 can transmit mmWave signals, which may be received by different Rx antennas 212 sequentially after reflected by sounding or vibrating sources in a venue and other objects in the same venue. In some embodiments, the Tx 211 is a Bot as described above; and the Rx 212 is an Origin as described above. While the Tx 211 and the Rx 212 are physically coupled to each other in FIG. 2, they may be separated in different devices in other embodiments. In some embodiments, the device including the Tx 211 and the Rx 212 serves as the mmWave radar. In other embodiments, the mmWave radar also includes or is coupled to a processor to process the received radar signal at the Rx 212. In various embodiments, the processor may be physically coupled to the Tx 211, the Rx 212, both, or neither.

As shown in FIG. 2, the goal of the radio feature extraction module is to output individual radio streams from sources in the environment. To achieve that, the system can adopt a variety of methods in an efficient pipeline to detect and locate targets. Unlike existing works, RadioSES does not rely on a spectrogram-based metric to localize people in the environment, but utilizes classical, efficient methods to extract the corresponding range-azimuth bins.

In some embodiments, at the channel information module in FIG. 2, RadioSES can work with any type of radar that can report a channel impulse response (CIR), e.g. a frequency modulated continuous wave (FMCW) radar. When using an FMCW radar, extracting the CIR includes applying an operation called range-FFT. As mmWave devices usually have multiple antennas, one can define the CIR at the m-th antenna $h_m(\tau)$ as:

$$h_m(\tau) = \sum_{r=0}^{R-1} \alpha_{m,r} \delta(\tau - \tau_r) + \epsilon(\tau),$$

where R is the number of the CIR range bins, $\delta(\cdot)$ is the Delta function representing the presence of an object at the corresponding location, $\alpha_{m,r}$ and $\tau_r$ denote the complex amplitude and the propagation delay of the r-th range bin, and $\epsilon$ denotes the additive noise, respectively. Here, the range resolution $\Delta R$ can be inferred from the time resolution, $\Delta \tau$, which is inversely proportional to bandwidth (corresponding to 4.26 cm for our device). Therefore, a separate stream from very close targets can be extracted. The CIR is captured repeatedly during sensing, and is time dependent. To simplify CIR equation, one can denote the CIR from m-th antenna, at r-th range bin, at time index t as $h_{m,r}(t)$. As such, $h_{m,r}(t)$ is quantized with respect to time, range bin, and antenna index.

In some embodiments, at the digital beamforming module in FIG. 2, using the individual received streams from each antenna, RadioSES extracts range-azimuth information with classical beamforming. Range-azimuth CIR may be denoted by $h_{r,\theta}(t)$, where $\theta$ represents the azimuth angle. In some examples, the virtual antenna array elements are placed $d=\lambda/2$ apart, where $\lambda$ is the wavelength, and $h_{r,\theta}(t)$ can be given as:

$$h_{r,\theta}(t) = s^H(\theta) h_{m,r}(t) + \epsilon(t),$$

where $s^H(\theta)$ is the steering vector for angle $\theta$, and $\epsilon$ is the additive noise. The coefficients of the steering vector are:

$$s_m(\theta) = \exp\left(-j2\pi \frac{d \sin\theta}{\lambda}\right).$$

and the channel vector is $h_{m,r}(t)=[h_{1,r}(t), h_{2,r}(t), h_{m,r}(t)]$, with M being the total number of antenna elements.

Figure 3:
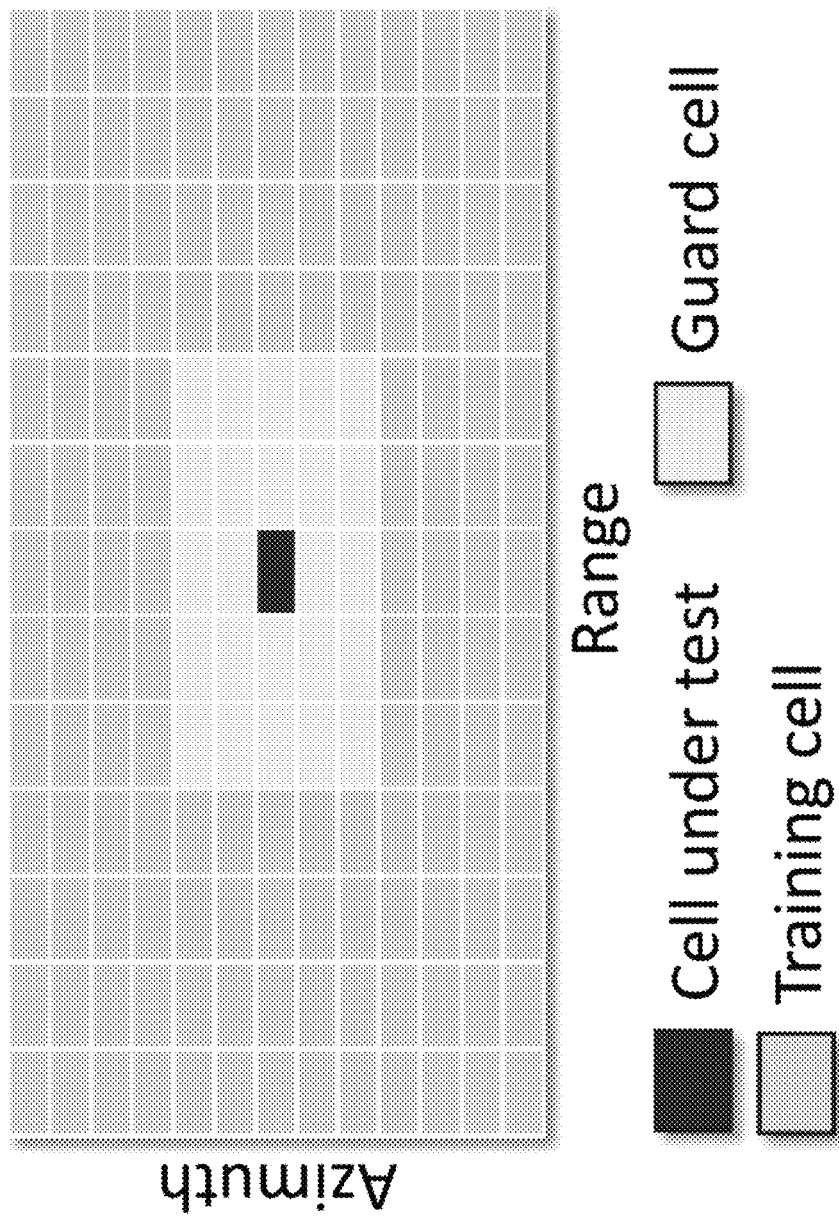
FIG. 3 illustrates a constant false alarm rate (CFAR) window for radio feature extraction, according to some embodiments of the present disclosure.
Figure 4:
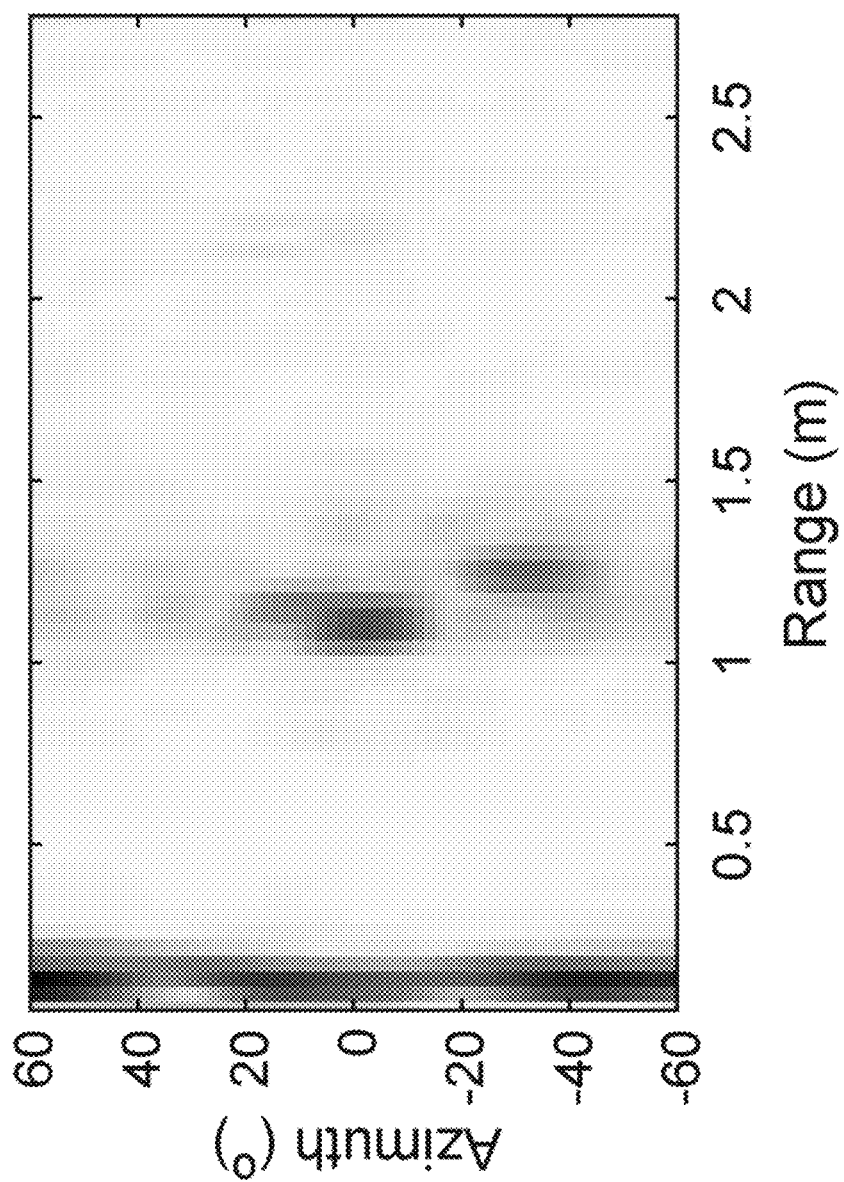
FIG. 4 illustrates an amplitude map for radio feature extraction, according to some embodiments of the present disclosure.

In some embodiments, at the target detection module in FIG. 2, to detect human bodies in the environment, RadioSES first extracts the reflecting objects in the environment. As suggested by the CIR equation, the presence of objects creates strong returned signals, whereas when there is no object, returned signals only include noise. For target detection, one can utilize a classical approach in the radar literature, constant false alarm rate (CFAR) detector, which adaptively estimates the background noise for different bins and thresholds each range-azimuth bin accordingly. In some embodiments, the 2D CFAR window shown in FIG. 3 is denoted with C, and CFAR threshold is denoted with γ. This window may be applied to the magnitude of the range-azimuth plane, and the corresponding range-azimuth plane is shown in FIG. 4. Therefore, the CFAR detection rule on the range-azimuth plane is given as:

$$B_{r,\theta}^{CFAR}(t) = \mathbb{1}\{(C \star |h_{r,\theta}|)(t) < \gamma(|h_{r,\theta}(t)|)\},$$

where $\star$ and $\mathbb{1}\{\cdot\}$ denote the convolution operation and indicator function, respectively.

Figure 5:
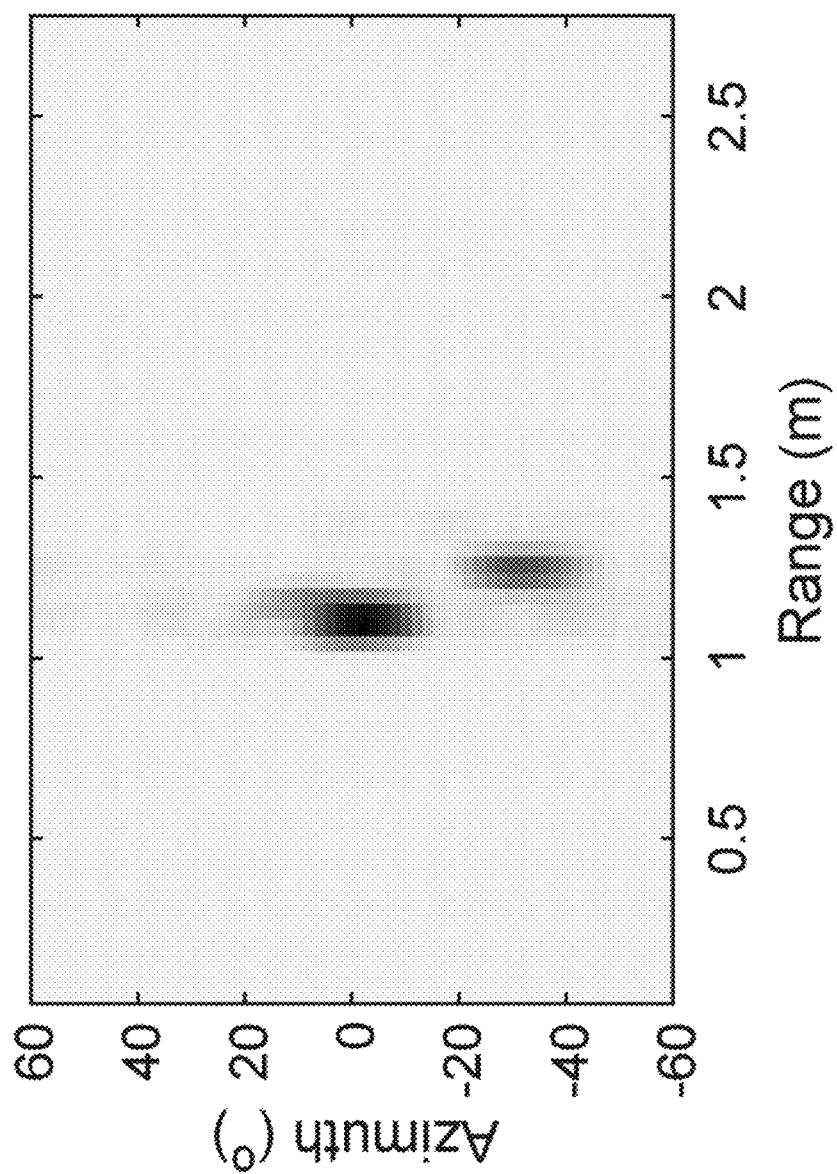
FIG. 5 illustrates a variance map for radio feature extraction, according to some embodiments of the present disclosure.

In some embodiments, at the clutter removal module in FIG. 2, previous module extracts a binary map with bins with reflecting objects, which can include static objects. On the other hand, even when a person is stationary, the radar signal still captures a variation at the person's location, due to inherent body motion from breathing and heart rate, a phenomenon used extensively in mmWave based person detection. Therefore, to remove the static objects and detect human bodies, the system can extract the variance at each range-azimuth bin, and use a threshold to identify static objects. One can denote the variance of $h_{r,\theta}(t)$ with $V_{r,\theta}(t)$, where an example can be seen in FIG. 5. Therefore, human detector output is $B_{r,\theta}^{stat} \triangleq \mathbb{1}\{V_{r,\theta}(t) > H^{stat}(r,\theta)\}$. Furthermore, bodies with excessive motion can also be filtered using a similar approach, and the system can reject those by: $B_{r,\theta}^{mov} \triangleq \mathbb{1}\{V_{r,\theta}(t) < H^{mov}(r, \theta)\}$, where $$H^{stat}(r, \theta) \triangleq \frac{\eta^{stat}\cos(\theta)}{(1+r\Delta R)^2}, H^{mov}(r, \theta) \triangleq \frac{\eta^{mov}\cos(\theta)}{(1+r\Delta R)^2}, \eta^{stat}$$

and $\eta^{mov}$ are empirically found thresholds.

Figure 6:
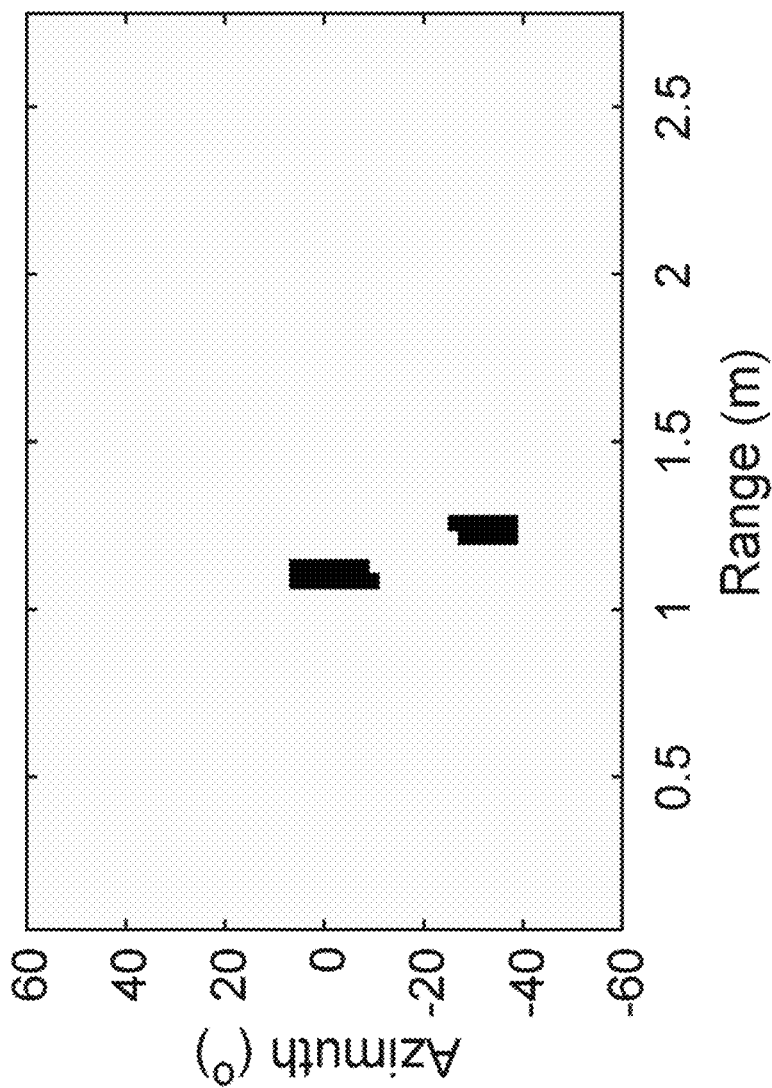
FIG. 6 illustrates a detection map for radio feature extraction, according to some embodiments of the present disclosure.

The minimum and maximum variances are defined with respect to $(r, \theta)$, in order to accommodate changing reflection energy with respect to angle and distance. The resulting binary detection map, $B_{ra}(t)$ is found by extracting intersection of all binary maps, i.e. $B_{r,\theta}(t)=\{B_{r,\theta}^{CFAR} \cap B_{r,\theta}^{stat} \cap B_{r,\theta}^{mov}\}(t)$, as shown in FIG. 6.

Figure 7:
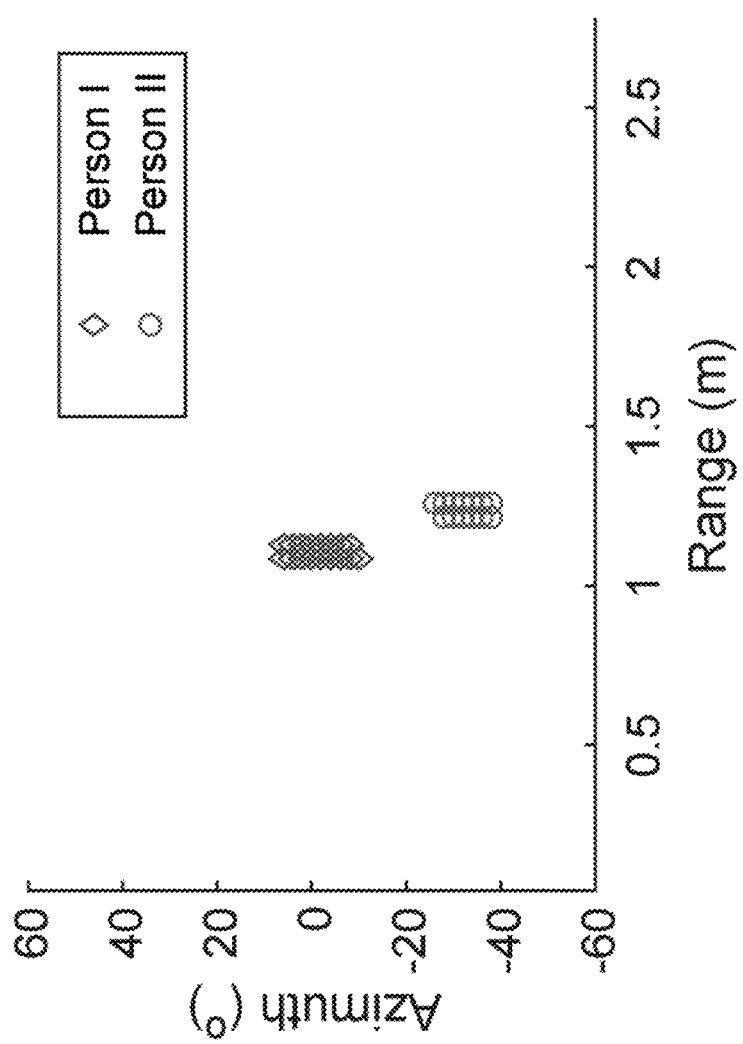
FIG. 7 illustrates a clustering output for radio feature extraction, according to some embodiments of the present disclosure.

In some embodiments, at the number of speaker estimation module in FIG. 2, each bin of binary detection map, $B_{r,\theta}(t)$ spans $(\Delta R, \Delta \theta)$ distance in 2D space. Considering the high range and angular resolution, a human body can span multiple bins in $B(r, \theta)$. To estimate the number of people, RadioSES clusters binary detection maps using a nonparametric clustering method, DBSCAN. The parameters for DBSCAN are set empirically, and an example clustering is shown in FIG. 7. Furthermore, since the number of people estimation and center extraction is done repeatedly for a window of size W, there is a need to match the locations of bodies at different time indices. The system can use Munkres' algorithm to continuously track the location of users.

In some embodiments, at the radio feature extraction module in FIG. 2, having extracted the number of persons and the corresponding range-azimuth bins, RadioSES extracts the complex radar signals from each person's center directly, following some raw-data based approaches. As there are many range-azimuth bins associated with the same person, RadioSES extracts the median bin for testing, whereas multiple nearby bins are used for training, which helps to boost dataset size and mitigate overfitting. In some examples, output dimensionality of the radar signals is $2 \times 10^{00}$ at 16 bits for a 1-second stream, which is lower than the microphone and typical video streams.

Figure 8A:
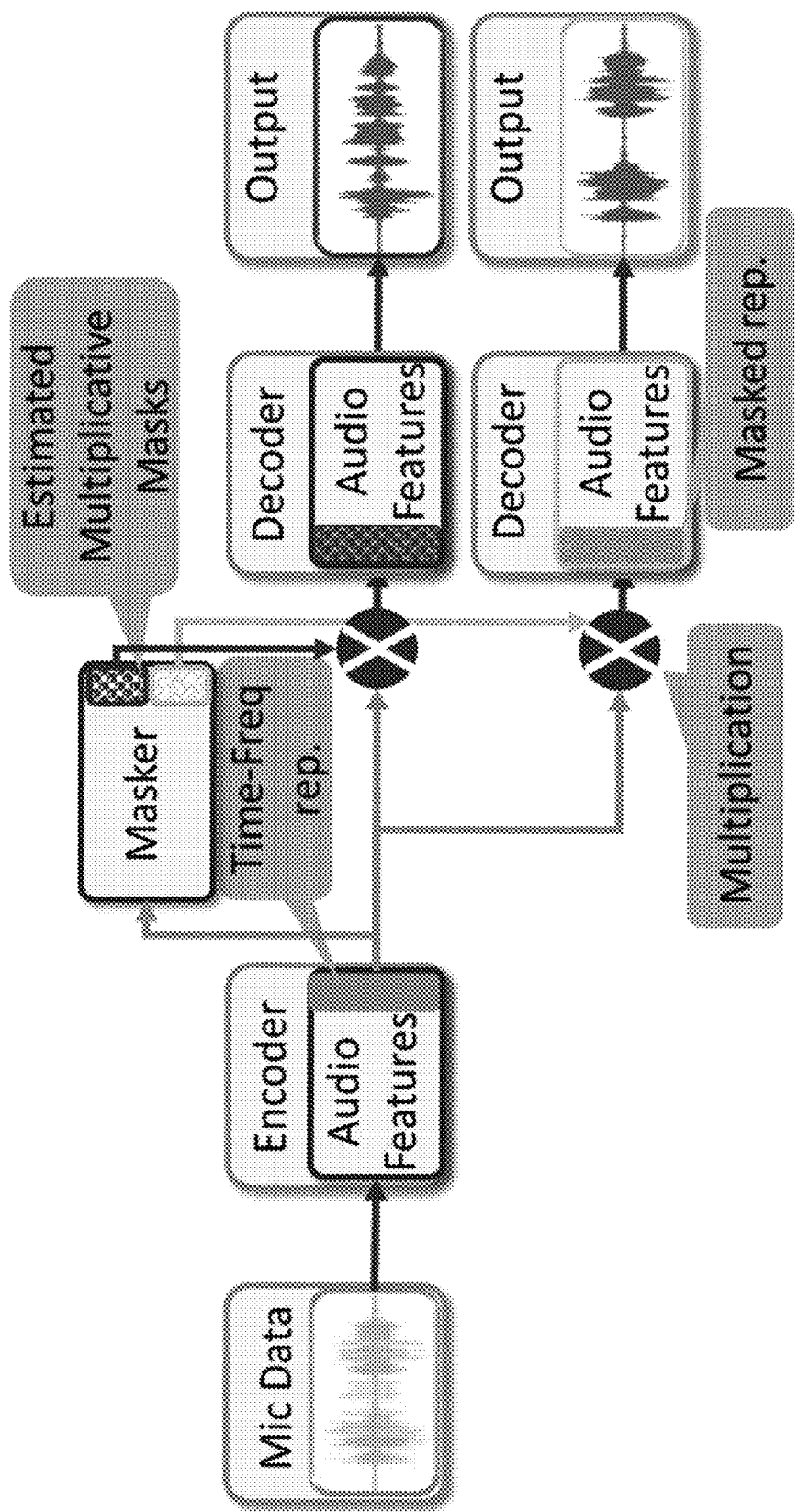
FIG. 8A and FIG. 8B illustrate a unimodal system and a multimodal system respectively, according to some embodiments of the present disclosure.

Usually, an SES model follows the architecture in FIG. 8A, with an encoder, masker, and a decoder block. Input encoding is multiplied with an estimated mask, which uses a decoder to reconstruct the time-domain signal. STFT may be used as the encoder, with the ideal binary mask being the training objective. The performance can be increased by using more optimal masks; but these still suffer from the fact that STFT-based encoding is not necessarily optimal for speech separation. Methods that replace STFT with adaptive encoders are found to be more optimal.

Figure 8B:
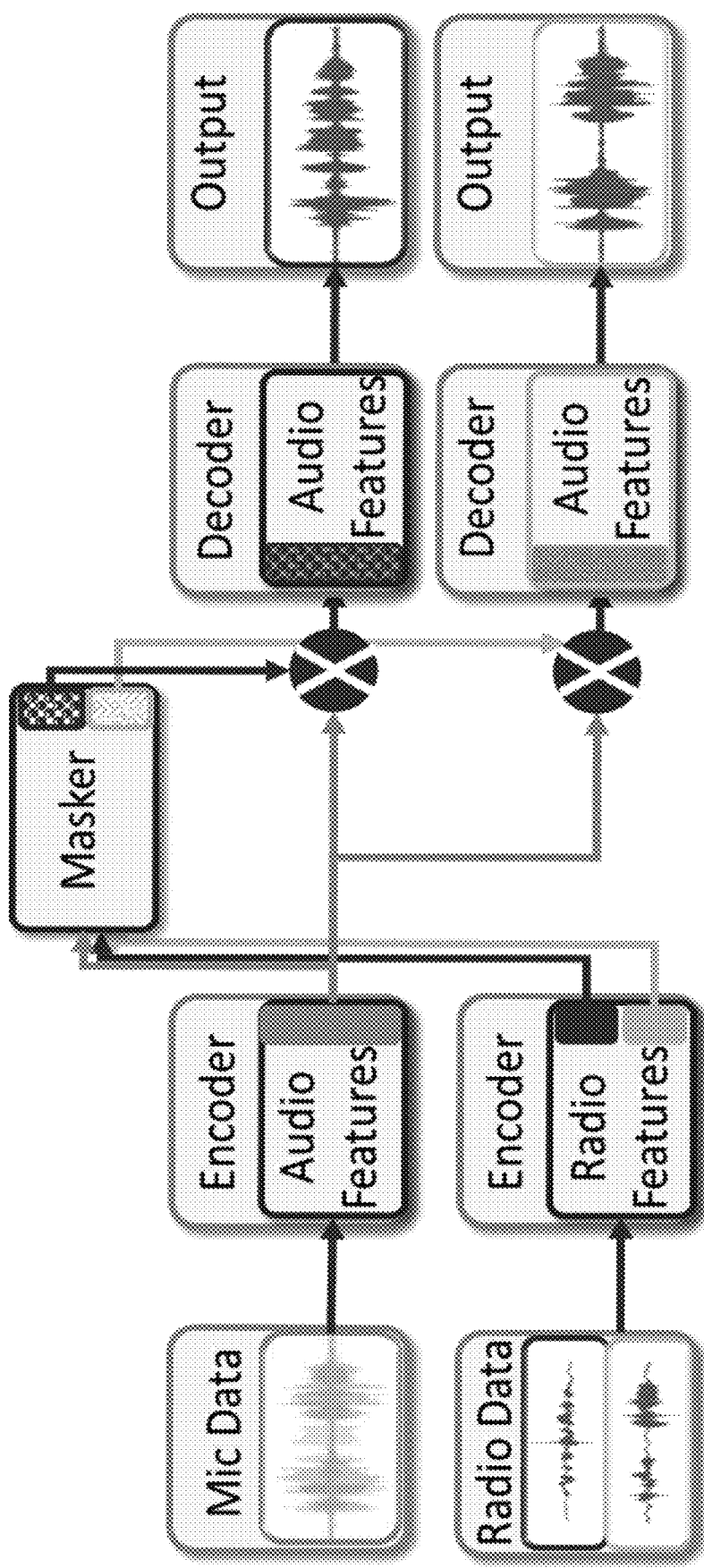

In some embodiments, the disclosed RadioSES uses the structure in FIG. 8B to realize the RadioSESNet module 202 in FIG. 2, which introduces radio modality. Radio streams are encoded, and concatenated with the audio stream to estimate the masks. However, this involves a few design choices as follows. Unlike audio signals, radio signals are complex-valued. Both real and imaginary parts of the radio signals change with respect to the motion and vibration. If a spectrogram representation is used as an input, it may not be optimal for neural network, and it usually involves in throwing away some signal content by only extracting amplitude, or half of the spectrogram (e.g. only positive Doppler shifts). Using either the real or imaginary part of the signal or combining both parts optimally with a linear projection also loses important signal content. Based on this, RadioSES may use adaptive front-end for radio streams.

To make RadioSES work with raw radio inputs, the system can apply random rotation in IQ plane. For example, the system can apply a high-pass filter on returned signals to reduce the effect of body motion. The high pass filter is used by the RadioSESNet module 202 in FIG. 2 to run with raw radar inputs. In some examples, one can select the cutoff frequency of the high pass filter at 90 Hz in order not to filter vocal folds harmonics. Afterward, the radio signals are encoded with an adaptive encoder.

After the encoder, the system can process audio and radio streams separately with individual blocks to exploit long-term dependencies within each modality. To that end, the system processes each modality through an efficient dual-path RNN block (DPRNN). DPRNN blocks do not suffer from limited context, which is a main issue with fully convolutional models. Afterward, the system can combine two modalities via resizing and concatenation on the feature dimension. These models are further processed with DPRNN blocks and 1D decoders before outputs.

Figure 9:
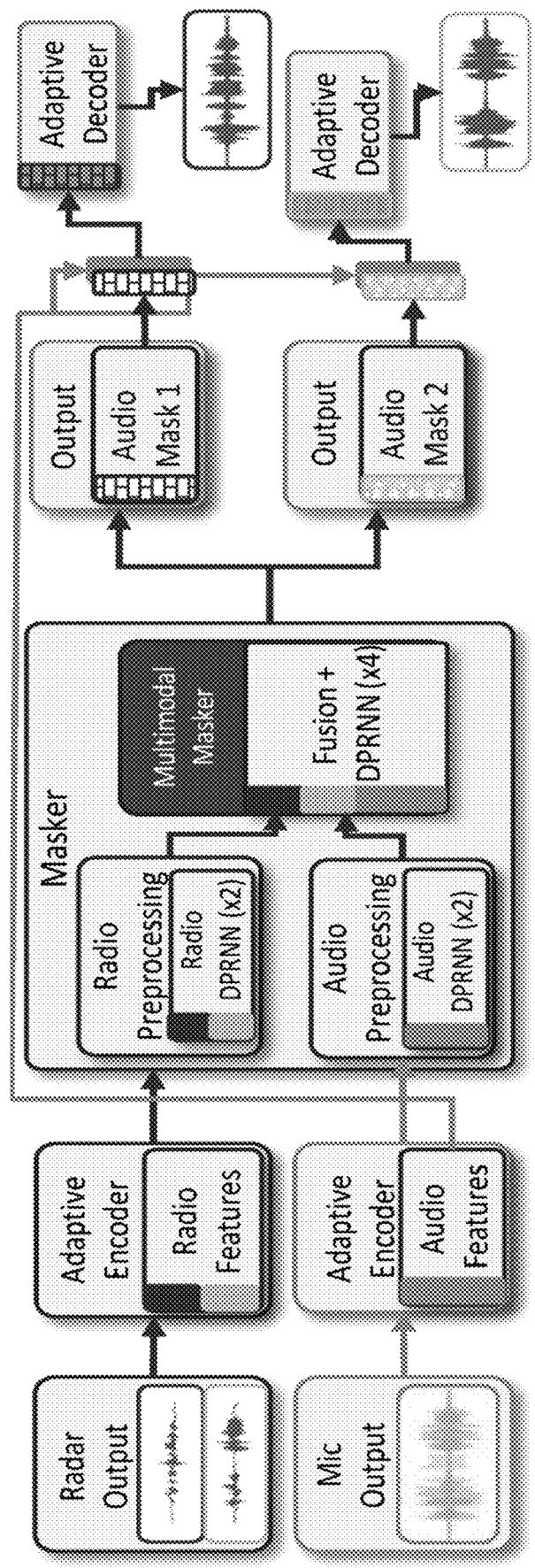
FIG. 9 illustrates a detailed structure of a speech enhancement and separation system, according to some embodiments of the present disclosure.

An exemplary design of RadioSESNet is shown in FIG. 9. In some examples, the audio encoder of RadioSESNet includes a 1D convolutional layer, with kernel size 16, and number of kernels 256, followed by ReLU nonlinearity and layer normalization. The radio channel of the RadioSESNet uses another 1D convolutional layer, nonlinearity, and normalization, with the same parameters, except that the number of filters being 64, due to the lower sampling rate. Stride size is set to ½ of the kernel width, resulting in 50% overlap between convolutional blocks. After the first layer, a second 1D convolution reduces the dimensionality to 64 for audio, and 16 for radio. Each radio stream uses the same encoder block to create an STFT-like representation. One can denote the distorted input audio with a, and radio streams with $r_i$, where i denotes the $i^{th}$ radio stream. Output of the audio and radio encoders are represented with $X_\star$, $\in \mathcal{R}^{N_\star \times L_\star}$, with $\star \in (a, r)$, for audio and radio stream, where one can drop the index i for simplicity. Here, $N_\star$ represents the number of features, and $L_\star$ represents the number of time samples of encoded representation.

Both encoded modalities are combined to estimate the masks for each source, as illustrated in the masker of FIG. 9. Each modality passes through individual DPRNN blocks, then fused by vector concatenation, and passes through four more DPRNN blocks before estimating the mask with a 2D convolutional layer, which matches the output with the expected mask number and size.

TABLE 1

Parameters for the Masker Layer for 2-Mix:

| Audio | $N_a 64$ | $K_a 128$ | $S_a 48$ |
| --- | --- | --- | --- |
| Radio | $N_r 16$ | $K_r 16$ | $S_r 48$ |
| Concatenation | $N_C 96$ | $K_C 128$ | $K_C 48$ |

When there are two people speaking at the same time in the venue, there are two radar outputs at the input of FIG. 9. The two radar outputs (e.g. of speaker 1 and of speaker 2) would go through the same adaptive encoder. Alternatively, they can be encoded differently. All the radio DPRNN can be the same for all radio signals and speakers. But the radio DPRNN can be different for different speakers in alternative embodiments.

In other embodiments, the structure in FIG. 9 can be generalized to 3, 4, 5 or more people. In such cases, there will be more radio stream.

Figure 10:
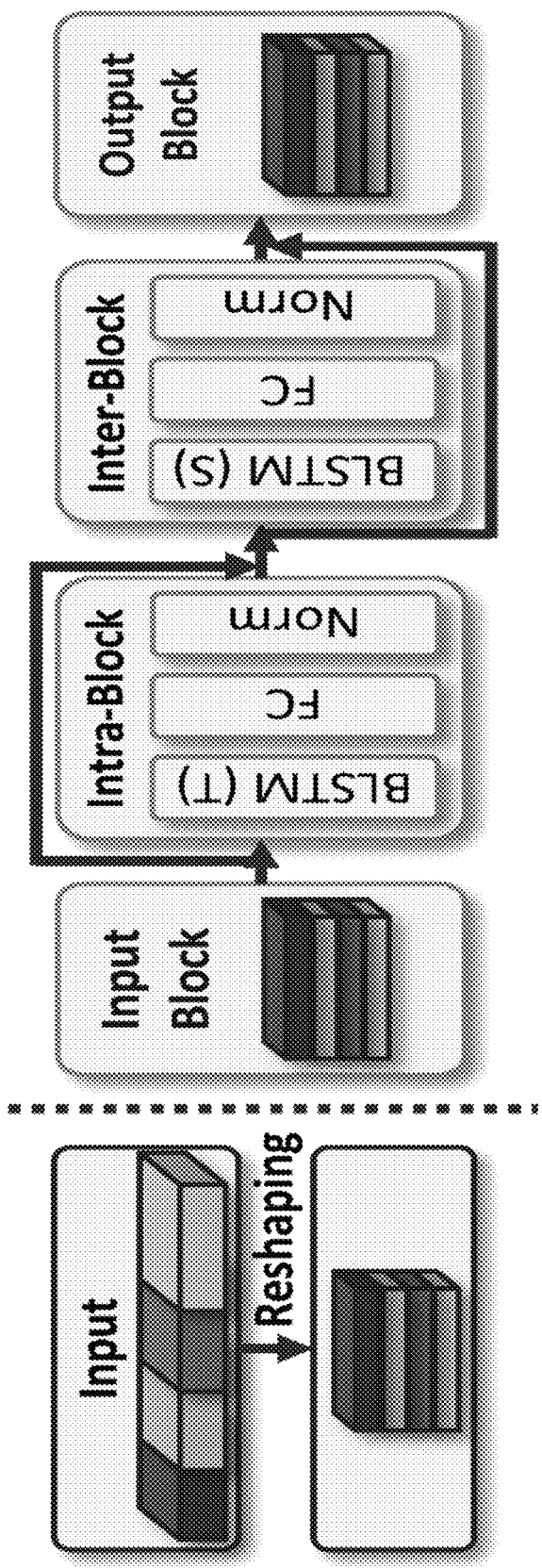
FIG. 10 illustrates a reshaping operation and a workflow of a dual-path recurrent neural network (DPRNN), according to some embodiments of the present disclosure.

In some embodiments, for processing the encoded data, the system can use DPRNN blocks, where an example DPRNN workflow is presented in FIG. 10. DPRNN processing may include reshaping the input data to a 3D representation, through means of extracting overlapping blocks, and concatenating through another dimension, and applying two consecutive RNN layers to different dimensions of the input block. The output of the reshaping operation can be represented as $\hat{X}_a \in \mathcal{R}^{N_a \times K_a \times S_a}$ with $K_a$ and $S_a$ denoting the block length and number of blocks. The input, output representations $X_r$, $\hat{X}_r$, and dimensionalities $N_r$, $L_r$, $K_r$ and $S_r$ are defined similarly for radio channel, and given in Table 1, whereas the flow for a single DPRNN processing is given in FIG. 10 as well.

In some embodiments, after a suitable reshaping operation, the input blocks are fed to an RNN module, which is operated along the S dimension of the 3D input, followed by a fully connected layer, and layer normalization. After a skip connection in between, a similar operation is repeated through K dimension to capture larger distance relationships between blocks. Each RNN block has depth 1, and fully connected layers are used to match the input size to the output size, which enables to repeat multiple DPRNN blocks without any size mismatches.

In some embodiments, at the output of the masker, a number of masks equal to the number of people are estimated, which is then used to decode the signal to extract time domain audio signals. DPRNN blocks are converted back to a representation similar to the one at the input, by an overlap-add method. The signal is fed through the decoder, which applies a transposed convolution operation. The output is a single channel representation, with the same dimensionality and the same number of filters in the encoder to preserve symmetry, and it is also adaptive.

In some embodiments, in order to train RadioSESNet, the system can use scale-invariant signal-to-distortion (SiSDR) as the loss function between the time-domain signals, which is given by:

$$SiSDR(a, \hat{a}) = 10\log_{10}\left(\frac{\left\|\frac{\hat{a}^T a}{\|a\|^2}a\right\|}{\left\|\frac{\hat{a}^T a}{\|a\|^2}a - \hat{a}\right\|}\right),$$

where a and $\hat{a}$ denote the target and the estimated sound signals. Use of SiSDR prevents scaling effects to dominate the error calculation, as the amplitude of extracted speech is not of interest. The SiSDR loss has been combined with $L_2$ norm regularization on the weights, where the decay factor is set to $1e^{-6}$. Since a separate model for different numbers of users has been trained, RadioSES switches to the appropriate model by estimating the number of sources.

Complexity and Causality are Particularly Considered in the Design.

In some embodiments, RadioSESNet has a compact design, with only 2.1 M parameters. Among these, radio stream occupies 320 k parameters, which could easily be fit on a small device. Forward pass of a 3-second input with RadioSESNet takes 4 ms on a modern GPU with batch processing, which is only 0.4 ms slower than the corresponding audio-only method.

In some embodiments, RadioSESNet uses unidirectional LSTMs in the recurrent layers of inter-block processing, whereas intra-blocks rely on BLSTMs which requires having the complete block in S dimension. Therefore, RadioSESNet can work in a causal fashion, with roughly 150 ms delay. RadioSES is thus already close to real-time processing.

For experiment and implementation of the disclosed RadioSES system, one can build a data collection platform to obtain large-scale data to train, validate, and evaluate RadioSES. As extracting clean and non-reverberant ground truth samples are important, one can reduce the echo in the room by sound-absorbing pads. In some embodiments, the system can collect clean audio data with a Blue Snowball iCE microphone, sampled at 48 kHz, radar data using a Texas Instruments (TI) IWR1443 mmWave radar, and video data using the front-facing camera of an iPhone 11 Pro. The radar is set to operate with a bandwidth of 3.52 GHz at a sampling rate of 1000 Hz. The system can align the radio signal and audio signal in the time domain using the correlation of their energy. Video data, captured at 1080p and 30 fps, is also collected, although the accompanying audio files are used for training.

In some embodiments, 19 users including native speakers and speakers with different accents are instructed to read phonetically rich sentences from the TIMIT corpus. The users come from a diverse background, where there are 5 native English speakers, along with 9 Chinese, 2 Indian, 2 Turkish, 1 Korean accents. One can remove sentences that are shorter than 25 characters in the dataset. Since the size of TIMIT corpus is limited, 200 common and 100 unique sentences are read by each participant. In total, 2100 different sentences and 5762 unique words are read by participants. The sentences are presented in mixed order, and the dataset includes a lot of pauses, and filler words, in contrast to publicly available datasets, which usually include professional speakers. During data collection, users sit approximately 40 cm away from the radio device and read each material at a normal speaking volume while not moving excessively.

In some embodiments, to generate the noisy and mixture sound signals, the system can follow the recipe used in LibriMix with the noise files from WHAM dataset. One can randomly select 13 users for training, and 4 users (2 male, 2 female) for evaluation. Validation set includes remaining two users, and unused speech of the users in the training set. After downsampling all audio files to 8 kHz, the system can create synthetic mixtures based on the shortest of the combined files, with a minimum duration constraint of 3-seconds. Each user's recordings are repeated ten times on average, which results in 25,826 utterances (≈30 hours). The gain factors are found by normalizing the loudness of speech and noise signals, and creating noisy mixtures in [−5, 5] dB signal-to-noise rate. The system may create two evaluation sets: i) mixtures from seen users, but unheard sentences, ii) mixtures from unseen users. This helps to explain dependency on seen/unseen users in RadioSES, as different users' radio signals can be different, not only due to their speaking, but also due to their body motion and physical characteristics.

In some embodiments, a multimodal system can fail easily and focus to use a single modality, which is known as mode failure. To prevent this and to further improve robustness, the dataset creation procedure includes the following. First, same-speaker mixtures: the dataset includes same-speaker mixtures, in order to prevent mode failure, which is shown to be effective in the audiovisual domain. Second, multi-microphone mixtures: as the data collection procedure includes two microphones, one can randomly select one when generating each mixture. The evaluation may be done with the better microphone, but this also boosts dataset size multiple folds without collecting more data. Third, clean and noisy mixtures: unlike the LibriMix dataset, one can create both noisy and clean mixtures of multiple speakers and use them to train a single model. Therefore, RadioSES uses a single model, whether an environment is clean or noisy.

In some embodiments, one can implement data collection and raw data processing modules of RadioSES in MATLAB, whereas the deep learning model is implemented in PyTorch, with the help of Asteroid library to follow standard training and evaluation protocols in monoaural SES, and to borrow implementations of existing methods, such as Conv-TasNet or DPRNNTasNet. In some embodiments, one can train RadioSESNet and DPRNNTasNet for 60 epochs, using a starting learning rate of $1e^{-3}$, which is halved when the validation loss did not improve for 5 consecutive epochs. Furthermore, the learning rate is scaled by 0.98 every two epochs. An early stopping criterion is set to 15 epochs. To accelerate training, one can use mixed-precision training. Thanks to the low complexity design of RadioSESNet, a single epoch takes roughly 10 minutes to train, with a batch size of 24, using a single NVIDIA RTX 2080S GPU.

As discussed previously, although microphone signals mostly correspond to speech signals, radar signals can be affected by motion, vibration, and environmental factors. Furthermore, it is usually not straightforward to make a multimodal system work easily. To improve the robustness of radio signals, one can implement the following. First, capturing multiple snapshots: since the radio signals from the multiple range-azimuth bins of the same person can change, one can record multiple range-azimuth data in the dataset. In each epoch, one can randomly select a range-azimuth bin for training among 8 candidates, whereas validation and testing use the median bin. This boosts the dataset size significantly without relying on synthetic methods and enables to use a wider range of bins, instead of searching for the most optimal bin. Second, input distortions: the input radio streams are distorted in different ways. These include introducing random rotation, adding noise at different variance levels, replacing some part of the radio signal with zeros (to imitate data loss), or removing some radio signals completely to reduce mode failure.

In some embodiments, one can report the following metrics to evaluate performance of RadioSES: (a) SiSDR: Scale-invariant signal-to-noise ratio, which is an indicator of signal levels, with a normalization factor to prevent scaling of the signals to increase metric unfairly; (b) SIR: Signal-to-interference ratio, which measures the leakage from one person to another when there are multiple speakers, and only reported for SS tasks; (c) STOI: Short time intelligibility metric, correlates with the word error rate, reported from 0 to 1; (d) PESQ: Perceptual evaluation of the sound quality, measured from 0 to 5. Since measuring human perception requires user studies, PESQ is proposed as an alternative, when user studies are not feasible.

TABLE 2

Results for enhancing single speaker speech

| | Evaluation | | | | | |
| | Seen | | | Unseen | | |
| Model | SiSDR | STOI | PESQ | SiSDR | STOI | PESQ |
| Input | 3.9 | 0.74 | 1.55 | 3.8 | 0.70 | 1.54 |
| WaveVoiceNet | 0.6 | 0.60 | 1.28 | 0.7 | 0.62 | 1.27 |
| ConvTasNet | 14.5 | 0.90 | 2.67 | 13.6 | 0.87 | 2.55 |
| SudoRMRF | 14.0 | 0.88 | 2.32 | 12.2 | 0.84 | 2.04 |
| DPRNNTasNet | 14.2 | 0.89 | 2.62 | 13.0 | 0.86 | 2.46 |
| RadioSES | 14.5 | 0.90 | 2.68 | 13.3 | 0.87 | 2.52 |

Baseline Methods: one can include several radio-only and audio-only methods in the literature for a variety of tasks. First, as a radio-only method, one can implement Wave-VoiceNet in WaveEar. This approach uses the radio modality alone to (re)construct sound signals from vocal folds vibration, and assumes no available microphones. It reconstructs magnitude of audio spectrograms and uses Griffin-Lim based phase reconstruction. One can use oracle phase of the clean audio signal instead, which poses an upper limit on its performance.

One can compare performance of RadioSES with other audio-only baselines, to illustrate gains from radio modality, and sustained performance of RadioSES. One can include ConvTasNet, one of the first adaptive-encoder based systems that outperformed STFT-based masks. Second, one can include DPRNNTasNet, which is the audio-only baseline of RadioSES. DPRNNTasNet has shown to outperform Conv-TasNet significantly, and can be considered as the state-of-the art. Third, one can use SudoRMRF, which simplifies DPRNNTasNet by replacing the RNN blocks with down-sampling and upsampling blocks and is shown to achieve similar performance. Last, one cannot compare with UltraSE, as it uses ultrasound modality, and different speakers and noise dataset. Due to changes in datasets and different sampling rate (16 kHz), it is not possible to copy their results and draw a direct comparison. On the other hand, UltraSE performs similar to ConvTasNet in 2-person mixtures, which has been included as a benchmark in the study.

In speech enhancement, RadioSES brings improvements to the audio-only baseline methods, as shown in Table 2. Since the background signals are statistically different than speech signals, one can see relatively small improvements. This observation is consistent with audiovisual methods (e.g. 0.1 dB improvement), and shows that RadioSES learns to exploit the radio information. On the other hand, results from WaveVoiceNet suggest that, radio modality is not sufficient to (re)construct less-noisy audio, and may not be feasible within the experimental setting. This can be attributed to differences in the hardware, the phonetically rich diverse dataset (5762 unique words), and users. As the results are poor, there is no need to investigate Wave-VoiceNet further in the experiments. ConvTasNet performs slightly better, but one can note that, the implementation uses a pretrained ConvTasNet on a much larger dataset. In addition, ConvTasNet is non-causal, and requires 1.5 s look-ahead. Despite these drawbacks, RadioSES achieves similar performance as ConvTasNet.

The speech-separation results with RadioSES, along with the previously mentioned baselines are presented in Table 3. For both separating single and noisy speech tasks, RadioSES outperforms a variety of state-of-the-art methods in audio-only domain, including DPRNNTasNet. The DPRNNTasNet implementation achieves 13.5 SiSDR in 2-person clean mixtures, which is close to the reported value in the Libri-Mix dataset, 16.0. Significant improvements with respect to SIR ratio can be observed in both clean and noisy cases, which can indicate the usefulness of radio channel for separating the mixtures. Furthermore, even though there is more variety in radio inputs (e.g. radio channel inputs are not only affected by the sound, but also by ambient motion and physical characteristics), RadioSES can still generalize better to unseen users, where the basic DPRNNTasNet suffers. RadioSES not only improves signal metrics, but also intelligibility and the perceptual quality metrics (PESQ). The difference between the audio-only baseline becomes larger, especially when the input mixtures are corrupted with noise and when there are multiple people. To that end, one can also train RadioSES with three people mixtures. As shown in Table 4, the improvements from RadioSES are even greater for 3-person mixtures, as radio helps to extract individual streams from each user. Since the performance gains from RadioSES increases with more users, one can expect it to work well for 4 or more users.

TABLE 3

Evaluation in 2-Person Mixtures (SS)

| | Model | 2-person mix (clean) | | | | 2-person mix (noisy) | | | |
|---|---|---|---|---|---|---|---|---|---|
| | | SiSDR | SIR | STOI | PESQ | SiSDR | SIR | STOI | PESQ |
| Seen | Input | 0.2 | −0.4 | 0.71 | 1.71 | −1.7 | 0.3 | 0.61 | 1.37 |
| | ConvTasNet | 11.3 | 18.5 | 0.87 | 2.53 | 6.1 | 16.8 | 0.77 | 1.78 |
| | SudoRMRF | 10.9 | 15.4 | 0.84 | 2.60 | 4.7 | 16.4 | 0.68 | 1.77 |
| | DPRNN | 13.5 | 21.5 | 0.91 | 2.63 | 8.9 | 20.3 | 0.81 | 1.96 |
| | RadioSES | 15.4 | 23.6 | 0.94 | 2.83 | 10.9 | 23.3 | 0.85 | 2.10 |
| Unseen | Input | 0.0 | 0.53 | 0.70 | 1.62 | −1.8 | 0.30 | 0.60 | 1.39 |
| | ConvTasNet | 9.5 | 16.0 | 0.84 | 2.38 | 5.2 | 15.0 | 0.72 | 1.67 |
| | SudoRMRF | 6.2 | 11.5 | 0.76 | 2.13 | 1.0 | 13.0 | 0.60 | 1.39 |
| | DPRNN | 10.8 | 18.1 | 0.86 | 2.38 | 8.9 | 17.3 | 0.75 | 1.83 |
| | RadioSES | 14.5 | 22.3 | 0.92 | 2.70 | 10.3 | 22.5 | 0.83 | 2.05 |

TABLE 4

Evaluation in 3-Person Mixtures (SS)

| | Model | 3-person mix (clean) | | | | 3-person mix (noisy) | | | |
|---|---|---|---|---|---|---|---|---|---|
| | | SiSDR | SIR | STOI | PESQ | SiSDR | SIR | STOI | PESQ |
| Seen | Input | −3.2 | −2.8 | 0.60 | 1.37 | −4.2 | −2.8 | 0.55 | 1.30 |
| | DPRNN | 7.2 | 14.0 | 0.81 | 1.95 | 4.9 | 15.7 | 0.74 | 1.68 |
| | RadioSES | 11.6 | 19.4 | 0.88 | 2.31 | 9.3 | 19.2 | 0.83 | 1.96 |
| Unseen | Input | −3.2 | −2.8 | 0.58 | 1.37 | −4.2 | −2.8 | 0.54 | 1.31 |
| | DPRNN | 4.2 | 10.2 | 0.73 | 1.72 | 2.6 | 12.5 | 0.66 | 1.55 |
| | RadioSES | 10.7 | 18.2 | 0.86 | 2.21 | 8.6 | 18.2 | 0.81 | 1.90 |

TABLE 5

Performance with respect to multiple experiments of sources

| | Exp | | | | | | | | | |
|---|---|---|---|---|---|---|---|---|---|---|
| | Distance | | | | | | Orientation | | | |
| | Case | | | | | | | | | |
| | 50 cm | | 75 cm | | 100 cm | | 0° | | 15° | |
| Metric | | | | | | | | | | |
| | AO | AR | AO | AR | AO | AR | AO | AR | AO | AR |
| SiSDR | 6.3 | 10.9 | 3.8 | 8.6 | 2.3 | 4.3 | 3.8 | 8.6 | 3.6 | 7.8 |
| SIR | 12.5 | 18.3 | 9.9 | 15.6 | 8.7 | 9.8 | 9.9 | 15.6 | 9.6 | 14.8 |

TABLE 5-continued

Performance with respect to multiple experiments of sources

| | | | | | | | | | | |
|---|---|---|---|---|---|---|---|---|---|---|
| STOI | 0.83 | 0.93 | 0.79 | 0.90 | 0.74 | 0.81 | 0.79 | 0.90 | 0.78 | 0.89 |
| PESQ | 2.17 | 2.61 | 1.97 | 2.42 | 1.79 | 2.00 | 1.97 | 2.42 | 1.91 | 2.32 |

| Exp | | | | | | | | | | |
|---|---|---|---|---|---|---|---|---|---|---|
| Orientation | | | | Case Head Orientation | | | | | | |
| 30° | | 45° | | 0° | | 15° | | 30° | | |
| Metric | | | | | | | | | | |
| AO | AR | AO | AR | AO | AR | AO | AR | AO | AR | |
| SiSDR | 4.4 | 8.3 | 4.2 | 8.2 | 6.3 | 10.9 | 5.6 | 9.8 | 5.4 | 9.3 |
| SIR | 10.6 | 15.1 | 10.2 | 15.6 | 12.5 | 18.3 | 11.7 | 16.8 | 11.5 | 16.3 |
| STOI | 0.79 | 0.89 | 0.78 | 0.88 | 0.83 | 0.93 | 0.80 | 0.90 | 0.79 | 0.89 |
| PESQ | 2.00 | 2.33 | 2.02 | 2.37 | 2.16 | 2.61 | 2.11 | 2.46 | 2.10 | 2.43 |

Figure 11:
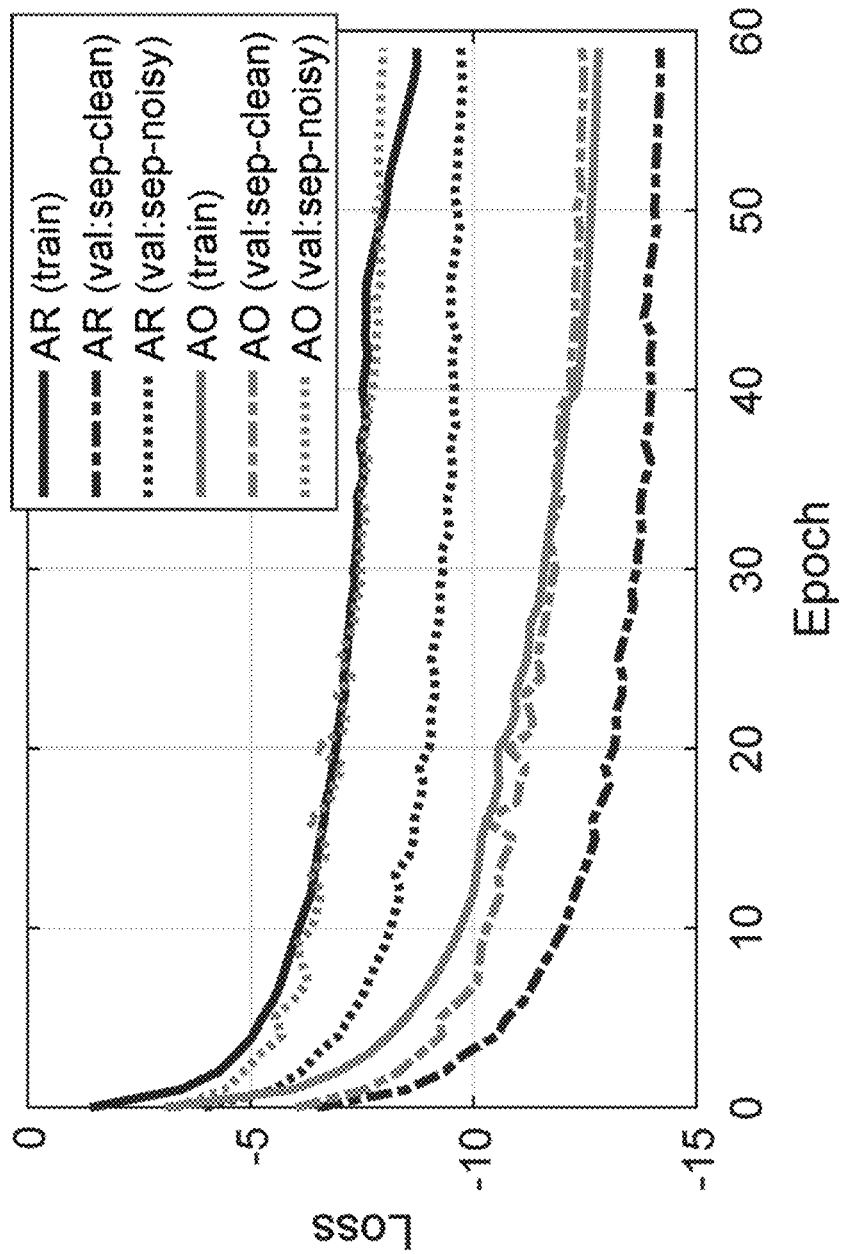
FIG. 11 illustrates learning curves for audio-only (AO) and audio-radio (AR) systems, according to some embodiments of the present disclosure.

As mentioned previously, introducing another modality has many benefits, such as guiding the loss function at the beginning of training to solve permutation problem and estimating the number of sources. To that end, in FIG. 11, one can compare the loss values on training and validation sets. As shown in FIG. 11, the audio-radio system has a much steeper learning curve at the beginning, along with a better convergence point.

Figure 12:
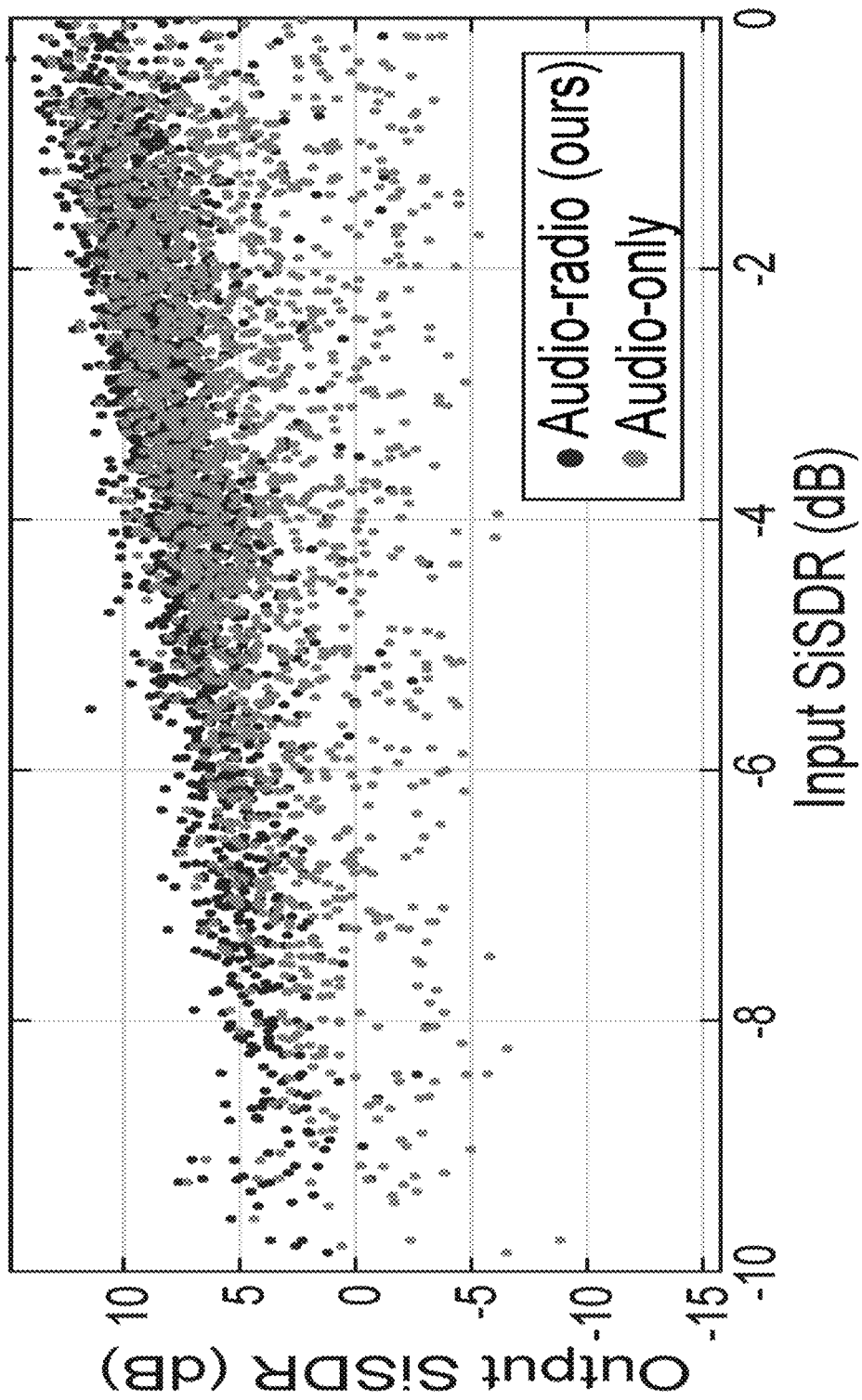
FIG. 12 illustrates a performance comparison between audio-only (AO) and audio-radio (AR) systems, according to some embodiments of the present disclosure.
Figure 13:
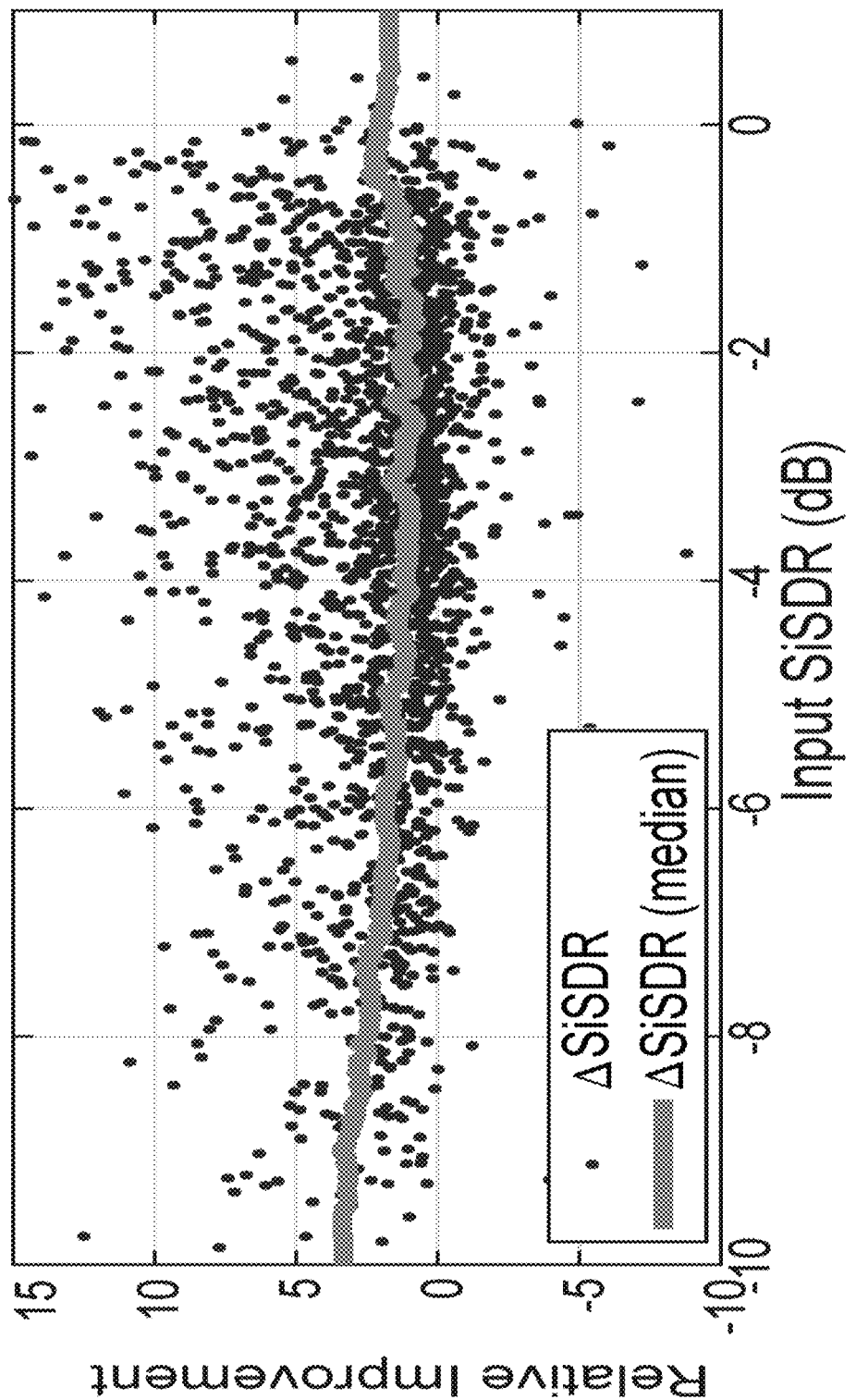
FIG. 13 illustrates a differential gain for an audio-radio (AR) system compared to an audio-only (AO) system, according to some embodiments of the present disclosure.

Furthermore, in FIG. 12, one can compare the output SiSDR of RadioSES with its audio-only baseline. As shown in FIG. 12, the disclosed RadioSES method is superior to the audio-only baseline, and the performance gains are consistent through different input SiSDR levels. To investigate the consistency of audio-radio system over audio, one can plot the differential gain in terms of SiSDR as in FIG. 13 from the radio channel. To characterize the incorrect associations, one can check the amount of samples with $\Delta(DB_i) < -3$ is 1.03%, indicating correct physical association of sources for 98.97% of the time.

In some embodiments, one can further evaluate the performance of RadioSES in varying settings, conducted in a different location than the original data collection location. Since it is difficult to simulate the extracted radio signals from different environmental scenarios, one can collect data at a variety of settings. For example, to test the effect of distance, one can collect multiple user data at different distances, (e.g. 75 cm), and create mixtures from that location. One can normalize input data streams to the same loudness levels for a fair comparison, although minor differences between each setting are inevitable. In order to show improvements, one can present each settings' performance along with the audio-only baseline, and show how RadioSES preserves a better performance in those settings. For presentation, FIG. 11 refers RadioSES as the audio-radio (AR) method, whereas baseline DPRNNTasNet is noted as audio-only (AO) method. As shown in FIG. 11, RadioSES mostly outperforms audio-only baseline with 4 dB improvement in the dataset, which includes unseen and same-speaker mixtures. This evaluation is done with clean mixtures for consistency, although one can observe similar gains in noisy mixtures as well.

Figure 14A:
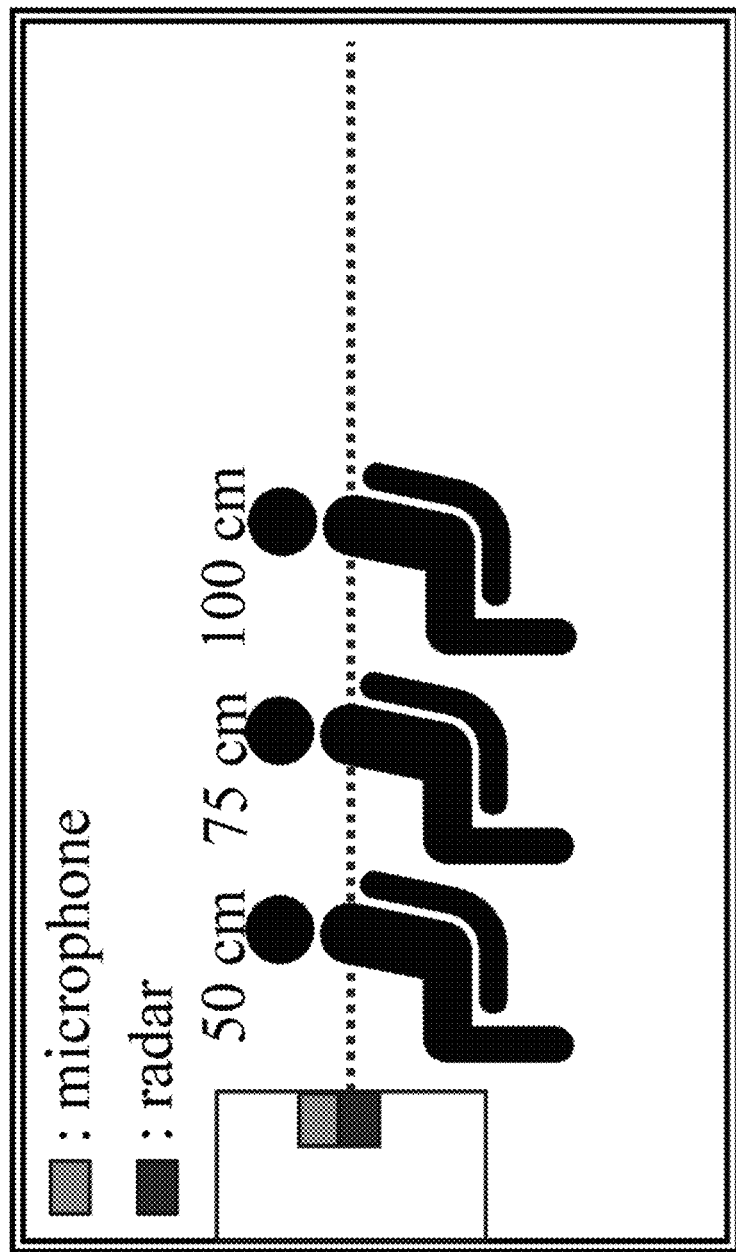
FIGS. 14A-14C illustrate different experimental settings for a speech enhancement and separation system, according to some embodiments of the present disclosure.

First, one can evaluate the effect of distance on the signal separation tasks, as illustrated in FIG. 14A. As shown in Table 5, RadioSES can work robustly until the speakers are 1 m away from the device, and preserve the gains compared to the audio-only baseline. The performance for both cases decrease, which is due to training dataset being captured from a short distance only. As the distance increases, the received audio signals change due to the room impulse response and microphone nonlinearity, which is a phenomenon used for coarse source distance estimation with microphones recently. In some examples, the performance gains from radio channel does not decrease much from 0.5 m and 1 m, and the main bottleneck for lower performance is the variety of audio data. A high-performance system can be built by capturing more diverse audio data.

Figure 14B:
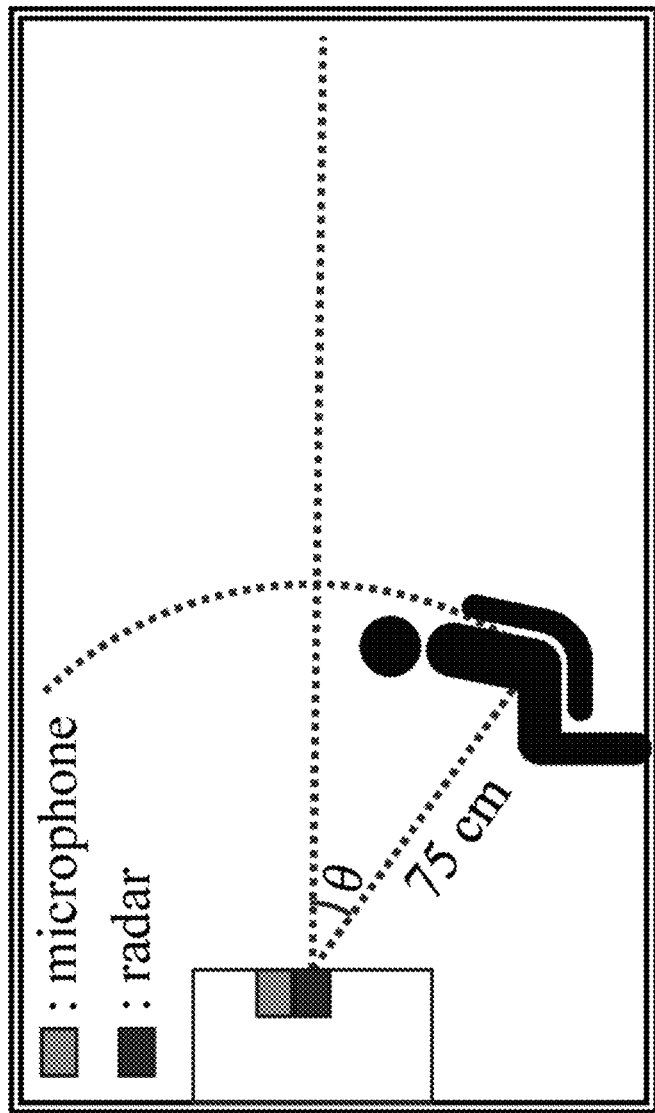

Second, the users are asked to sit 0.75 m away from the device, and change their orientation to explore the practical area of sensing, as illustrated in FIG. 14B. The RadioSES can work until 45°, without any performance decrease, as presented in orientation columns of Table 5. The gains from the audio-radio system are consistent (e.g. ~4 dB in SiSDR) through each setting, showing the effectiveness in modeling of the radio stream. Furthermore, this observation is consistent with that of distance, as a different deviation angle from the microphone does not create any distance-based nonlinearity, although it reduces the radio-reflection SNR.

Figure 14C:
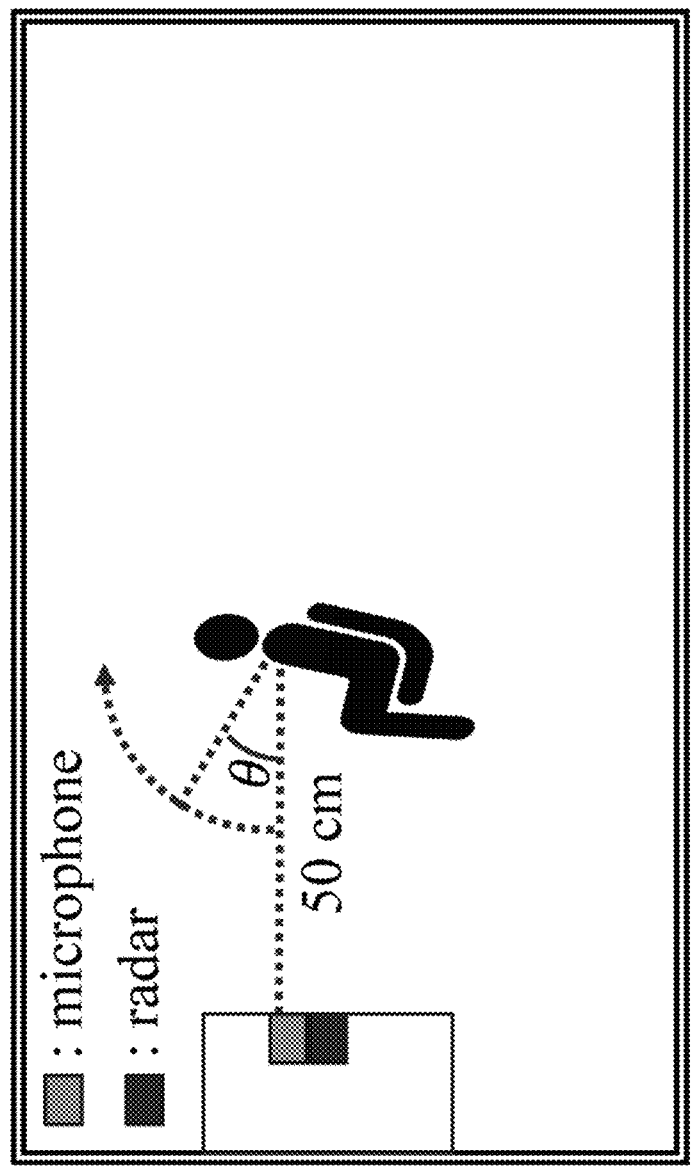

Third, the users are asked to sit at 0.5 m, and rotate their heads from 0 degrees to 15 and 30 degrees, as shown in FIG. 14C. For example, if a user sits in front of a laptop or monitor, the user would naturally swing head to see different content on the screen, and 30 degrees of head rotation at 0.5 m enables to see the entire area of a big screen. Furthermore, if RadioSES is using lip motion, instead of vocal folds vibration, the results are expected to deteriorate quickly. The results are presented in the head orientation column of Table 5, which indicates that RadioSES is robust to changes in head orientation, even though the training procedure does not include explicit head-rotation data.

Fourth, the users are asked to perform a variety of distortions. For example, the users are asked to perform motions in front of the radar while speaking. To have the experiments controlled, the users are asked to move their heads up and down, left-to-right and back-and-forth naturally, as it can happen during speech. Next, data are collected with users wearing a mask, which plays a role as an occlusion. As shown in Table 6, RadioSES is not affected by the head motion. Furthermore, unlike certain visual enhancement methods which lose their advantage with occlusions, RadioSES is robust against wearing a mask, and can preserve the improvements compared to the audio-only method. This is due to the fact that vocal folds vibration are extracted from the body and throat, not from the face.

TABLE 6

Effect of Motion Distortion

| Metric | Exp | | | | | | | |
|---|---|---|---|---|---|---|---|---|
| | Motion Interference Case | | | | | | Occlusion | |
| | Back-forth | | Left-right | | Up-down | | Face Mask | |
| | AO | AR | AO | AR | AO | AR | AO | AR |
| SiSDR | 6.2 | 10.5 | 5.7 | 10.3 | 5.6 | 10.4 | 5.4 | 10.5 |
| SIR | 12.3 | 17.8 | 11.6 | 17.6 | 11.6 | 17.6 | 11.6 | 17.2 |
| STOI | 0.81 | 0.91 | 0.81 | 0.91 | 0.80 | 0.91 | 0.82 | 0.92 |
| PESQ | 2.14 | 2.53 | 2.09 | 2.53 | 2.12 | 2.56 | 2.07 | 2.51 |

TABLE 7

In the Wild Experiment Results

| Metric | Case | | | | | |
|---|---|---|---|---|---|---|
| | Speech Enhancement | | | Speech Separation | | |
| | Clean | AR | Noisy | Clean | AO | AR |
| WER | 14 | 45 | 63 | 20 | 61 | 55 |
| CER | 8 | 32 | 54 | 11 | 50 | 40 |

In an exemplary experiment, multiple users are asked to sit within the same room, to test speech enhancement and separation in the wild. A user is asked to read Rainbow and Arthur passages, while background noises are played from a pair of speakers. Since this experiment does not have the ground truth clean signals, one can only evaluate the performance in terms of word-error-rate, and character-error-rate. To have a fair comparison, the users are asked to read the same material in another quiet environment to capture the performance in that setting. One can use Google's speech-to-text engine without any model adaptation to construct transcripts. As the speakers are not native speakers, and the RadioSES is implemented with telephone-quality speech (8 kHz), overall error-rate is higher. On the other hand, as presented in Table 7, RadioSES can enhance and separate multi-person mixtures and outperform the audio-only baseline for speech separation.

In other exemplary experiments, one can corrupt input signals by adding noise and zero-padding, which helps to gain insight to the performance changes when people are further away, or when there is package loss in the system. These experiments are done with the first 3-seconds of the audio streams, as longer audio streams already require some zero-padding or overlapping block processing. One can add white Gaussian noise to obtain radar data at varying SNRs from 20 to −10 dB levels, and report the performance metrics in Table 8. At larger distance, radio signals are expected to be noisy, and this experiment explores until when the radio signals are still useful. RadioSES outperforms audio baseline, until a radio SNR of −5 dB. When the radio signal has further noise, similar performance as the audio baseline is achieved. This experiment indicates that there is great potential for RadioSES at larger distances.

TABLE 8

Performance for noisy radio inputs

| | SiSDR | | | | | | |
|---|---|---|---|---|---|---|---|
| | ∞ | 20 dB | 10 dB | 5 dB | 0 dB | −5 dB | −10 dB |
| AO | 7.7 | | | | | | |
| RadioSES | 11.2 | 9.1 | 8.81 | 8.72 | 8.55 | 8.18 | 7.24 |

TABLE 9

Performance for partial radio inputs

| Metric | | | | | | |
|---|---|---|---|---|---|---|
| | AO | AR(%100) | AR(%66) | AR(%50) | AR(%33) | AR(%16) |
| SiSDR | 7.7 | 11.2 | 9.3 | 8.6 | 7.6 | 7.0 |
| SIR | 18.2 | 21.0 | 20.4 | 19.2 | 17.9 | 17.1 |
| STOI | 0.74 | 0.81 | 0.80 | 0.79 | 0.77 | 0.75 |
| PESQ | 1.92 | 2.20 | 2.13 | 2.10 | 2.03 | 1.98 |

In another experiment, one can zero pad the radio streams to reduce the available radar stream duration and test input radio durations of 2 s, 1.5 s, 1 s, and 0.5 s. Such configurations can be used when there are power requirements or package loss in the radio stream. As shown in Table 9, RadioSES can still help with speech separation tasks and improve the performance, compared to the audio-only baseline, when there is at least is of signal (i.e., 33%), in terms of perceptual quality. RadioSES system performs better than the audio-only baseline with respect to all inputs after 1.5 s of inputs. This indicates that for power-constrained settings, RadioSES can be operated with a duty-cycle less than 33%, and can still bring performance improvements, along with the aforementioned benefits of source association.

Although having speakers outside the FoV of the radar is not the key focus in RadioSES, one can explore the limits of RadioSES in such a mode of operation, by allowing one speaker to be outside the FoV. This setup requires using alternative approaches to estimate the number of speakers, as the radio-based methods will output fewer people. In practice, one may still use radio-based estimation by leveraging temporal information. One can zero pad a radio stream to simulate no information from the outside user, and understand whether RadioSES can benefit from having partial information. One can investigate a single person's missing case, but an extension to two missing people is also possible, with permutation-based methods. As shown in Table 10, RadioSES can still outperform the audio baseline with a large margin, and improve the performance, with missing people. There is not much performance decrease in 2-person noisy mixtures, when one person is outside. For 3-person mixtures, there is more decrease, but the gap between audio-only system is larger, and benefits of having the two other radio signals are clear.

In another experiment, one can train RadioSESNet without several blocks to understand the effect of each component. One can use clean 2-person mixtures for the ablation study. As shown in Table 11, one can remove i) Radio DPRNN blocks ii) Audio DPRNN blocks and iii) High-pass (HP) filter from the mask estimation. In the last case, audio stream is still used to encode the signal, in order not to change the main structure of RadioSES, but is not passed through any DPRNN blocks.

TABLE 10

Performance for partial detection of sources

| | Case | | | | | |
|---|---|---|---|---|---|---|
| | 2-person (noisy) | | | 3-person (noisy) | | |
| Metric | AO | AR(1) | AR(2) | AO | AR(2) | AR(3) |
| SiSDR | 7.7 | 10.1 | 11.2 | 4.9 | 8.3 | 9.3 |
| SIR | 18.2 | 20.7 | 21.0 | 13.0 | 17.7 | 19.2 |
| STOI | 0.74 | 0.81 | 0.81 | 0.74 | 0.81 | 0.83 |
| PESQ | 1.95 | 2.19 | 2.20 | 1.68 | 1.89 | 1.96 |

TABLE 11

Ablation Study: Radio modality and HP Filter are essential parts of RadioSESNet, whereas additional radio DPRNN blocks bring extra performance improvements.

| Model | SiSDR |
|---|---|
| RadioSESNet | 15.4 |
| w/o Radio DPRNN | 15.2 |
| w/o Any Radio | 13.5 |
| w/o Audio DPRNN | 4.8 |
| w/o HP filter | 0.1 |

In the present teaching, RadioSES is disclosed to improve robustness and performance of SES tasks using radio modality. While one can assume the vibration sources in the field-of-view of radio device to be from vocal folds only, radios can also measure vibration of other sources, such as guitars, or machinery. These vibration sources usually create some sound signature, and they can be used to estimate the sound from each source separately, as done using cameras.

Microphone arrays: in some embodiments, RadioSES uses a single microphone along with an mmWave sensing device. On the other hand, it is also possible for RadioSES to work with a microphone array, and radio modality can still bring further improvements to overall performance. Although beamforming in microphone arrays may indicate that radio modality is unnecessary, it can fail in noisy or reverberant environments. Since RadioSES senses the vibration of the source, it can estimate the direction of the sound for robust beam-steering or can extract the source vibration without any reverberation for further improvement.

Moving Speakers: in some embodiments, RadioSES is designed to track bodies with an inherent assumption that they do not move significantly. This is usually a common constraint in the relevant vital signs monitoring literature (breathing, heart rate), although some recent work started addressing motion for breathing. A more thorough system should support medium and high levels of source motion. To that end, coherent combining of multiple vital sign bins from person point clouds, or deep learning can be some interesting ideas to support multiple moving targets.

Sensing Distance: the experiments indicate that RadioSES can work robustly until the speakers are 1 m away from the device, and preserve the gains compared to the audio-only baseline. The performance for both cases decreases, which is due to the training audio dataset being captured from a short distance. However, the performance improvements from RadioSES do not decrease much with the distance. During the experiments, raw signal SNR is still high at large distances (e.g. 2.5 m) for people with low pitch (e.g. males). To support all users, one can limit the practical range to 1 m, much larger than the range of using ultrasound. Although not much radar signature can be captured from these bodies when they are further away, they can still be robustly detected, (e.g. as in vital sign monitoring), and even the reduced number of high quality radio streams can still help to improve the performance. Moreover, a different hardware can capture vocal folds vibration from 7 m, or at 50 m. RadioSES can benefit from better hardware significantly, and a more practical system can be built.

Multipath Effects: In the experiments, one can consider cases with multiple sources in front of the radar, and training data assumes perfectly clean radio-streams for each person. However, in challenging conditions, wireless sensing-based systems can have strong multipath effect. Although in mmWave bands, the effect is not as detrimental as 2.4/5 GHz, it can still reduce the performance. This issue may not be in short-range experiments, but it can be a limiting factor for long-range indoor sensing.

In some embodiments, costs for the evaluation board and a single mmWave device can be low. The size of these devices can go as small as 6 mm×6 mm to fit in a phone, and the power consumption can be as low as 1 mW. Furthermore, RadioSES does not require to run at 100% duty cycle. Based on application, lower power consumption can be achieved. As there are already devices with continuous mmWave sensing capabilities, RadioSES is feasible to be integrated with smart devices.

The disclosed RadioSES is a joint audio-radio speech enhancement and separation system using mmWave sensing. It improves the performance of existing audio-only methods with the help of radio modality and achieves similar improvements as audiovisual systems, with further benefits in computation complexity and privacy. Furthermore, RadioSES can detect the number of sources in the environment, and associate outputs with the physical speaker locations, all being challenging problems in audio-only domain. Real-world experiments show that RadioSES outperforms the state-of-the-art methods considerably, demonstrating the great potential of audio-radio SES.

Figure 15:
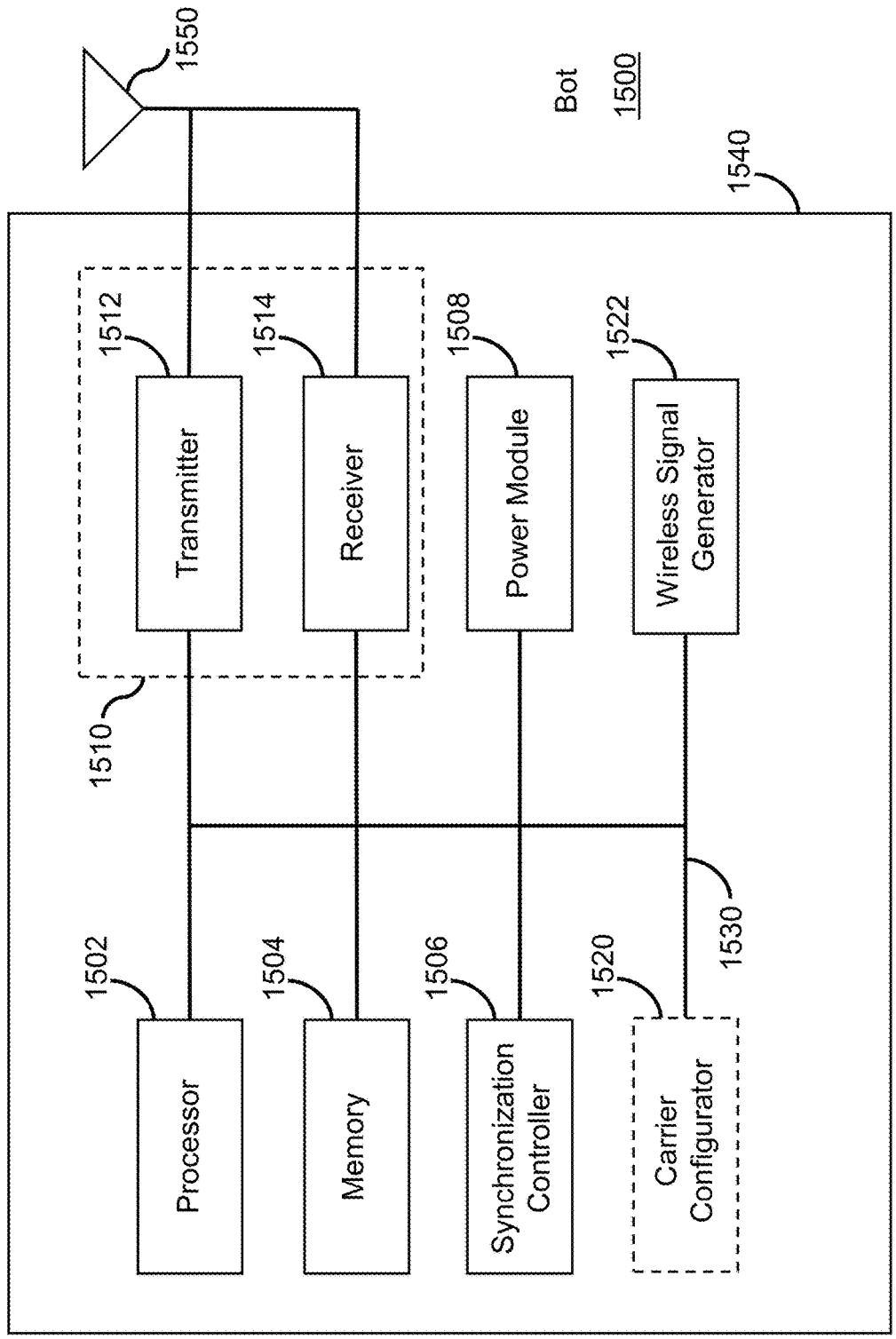
FIG. 15 illustrates an exemplary block diagram of a first wireless device of a system for radio-assisted signal estimation, according to some embodiments of the present disclosure.

FIG. 15 illustrates an exemplary block diagram of a first wireless device, e.g. a Bot 1500, of a system for radio-assisted signal estimation, according to some embodiments of the present disclosure. The Bot 1500 is an example of a device that can be configured to implement the various methods described herein. As shown in FIG. 15, the Bot 1500 includes a housing 1540 containing a processor 1502, a memory 1504, a transceiver 1510 comprising a transmitter 1512 and receiver 1514, a synchronization controller 1506, a power module 1508, an optional carrier configurator 1520 and a wireless signal generator 1522.

In this embodiment, the processor 1502 controls the general operation of the Bot 1500 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1504, which can include both read-only memory (ROM) and random access memory (RAM), can provide instructions and data to the processor 1502. A portion of the memory 1504 can also include non-volatile random access memory (NVRAM). The processor 1502 typically performs logical and arithmetic operations based on program instructions stored within the memory 1504. The instructions (a.k.a., software) stored in the memory 1504 can be executed by the processor 1502 to perform the methods described herein. The processor 1502 and the memory 1504 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1510, which includes the transmitter 1512 and receiver 1514, allows the Bot 1500 to transmit and receive data to and from a remote device (e.g., an Origin or another Bot). An antenna 1550 is typically attached to the housing 1540 and electrically coupled to the transceiver 1510. In various embodiments, the Bot 1500 includes (not shown) multiple transmitters, multiple receivers, and multiple transceivers. In one embodiment, the antenna 1550 is replaced with a multi-antenna array 1550 that can form a plurality of beams each of which points in a distinct direction. The transmitter 1512 can be configured to wirelessly transmit signals having different types or functions, such signals being generated by the processor 1502. Similarly, the receiver 1514 is configured to receive wireless signals having different types or functions, and the processor 1502 is configured to process signals of a plurality of different types.

The Bot 1500 in this example may serve as Bot 211 in FIG. 2 for radio-assisted signal estimation in a venue. For example, the wireless signal generator 1522 may generate and transmit, via the transmitter 1512, a wireless signal through a wireless channel in the venue. The wireless signal carries information of the channel. Because the wireless signal is reflected by a sounding or vibrating object in the venue, the channel information includes sound information from the object. As such, a speech or other expression can be detected or reconstructed based on the wireless signal. The generation of the wireless signal at the wireless signal generator 1522 may be based on a request for sound sensing from another device, e.g. an Origin, or based on a system pre-configuration. That is, the Bot 1500 may or may not know that the wireless signal transmitted will be used for wireless sound sensing.

The synchronization controller 1506 in this example may be configured to control the operations of the Bot 1500 to be synchronized or un-synchronized with another device, e.g. an Origin or another Bot. In one embodiment, the synchronization controller 1506 may control the Bot 1500 to be synchronized with an Origin that receives the wireless signal transmitted by the Bot 1500. In another embodiment, the synchronization controller 1506 may control the Bot 1500 to transmit the wireless signal asynchronously with other Bots. In another embodiment, each of the Bot 1500 and other Bots may transmit the wireless signals individually and asynchronously.

The carrier configurator 1520 is an optional component in Bot 1500 to configure transmission resources, e.g. time and carrier, for transmitting the wireless signal generated by the wireless signal generator 1522. In one embodiment, each CI of the time series of CI has one or more components each corresponding to a carrier or sub-carrier of the transmission of the wireless signal. The wireless sound sensing may be based on any one or any combination of the components.

The power module 1508 can include a power source such as one or more batteries, and a power regulator, to provide regulated power to each of the above-described modules in FIG. 15. In some embodiments, if the Bot 1500 is coupled to a dedicated external power source (e.g., a wall electrical outlet), the power module 1508 can include a transformer and a power regulator.

The various modules discussed above are coupled together by a bus system 1530. The bus system 1530 can include a data bus and, for example, a power bus, a control signal bus, and/or a status signal bus in addition to the data bus. It is understood that the modules of the Bot 1500 can be operatively coupled to one another using any suitable techniques and mediums.

Although a number of separate modules or components are illustrated in FIG. 15, persons of ordinary skill in the art will understand that one or more of the modules can be combined or commonly implemented. For example, the processor 1502 can implement not only the functionality described above with respect to the processor 1502, but also implement the functionality described above with respect to the wireless signal generator 1522. Conversely, each of the modules illustrated in FIG. 15 can be implemented using a plurality of separate components or elements.

Figure 16:
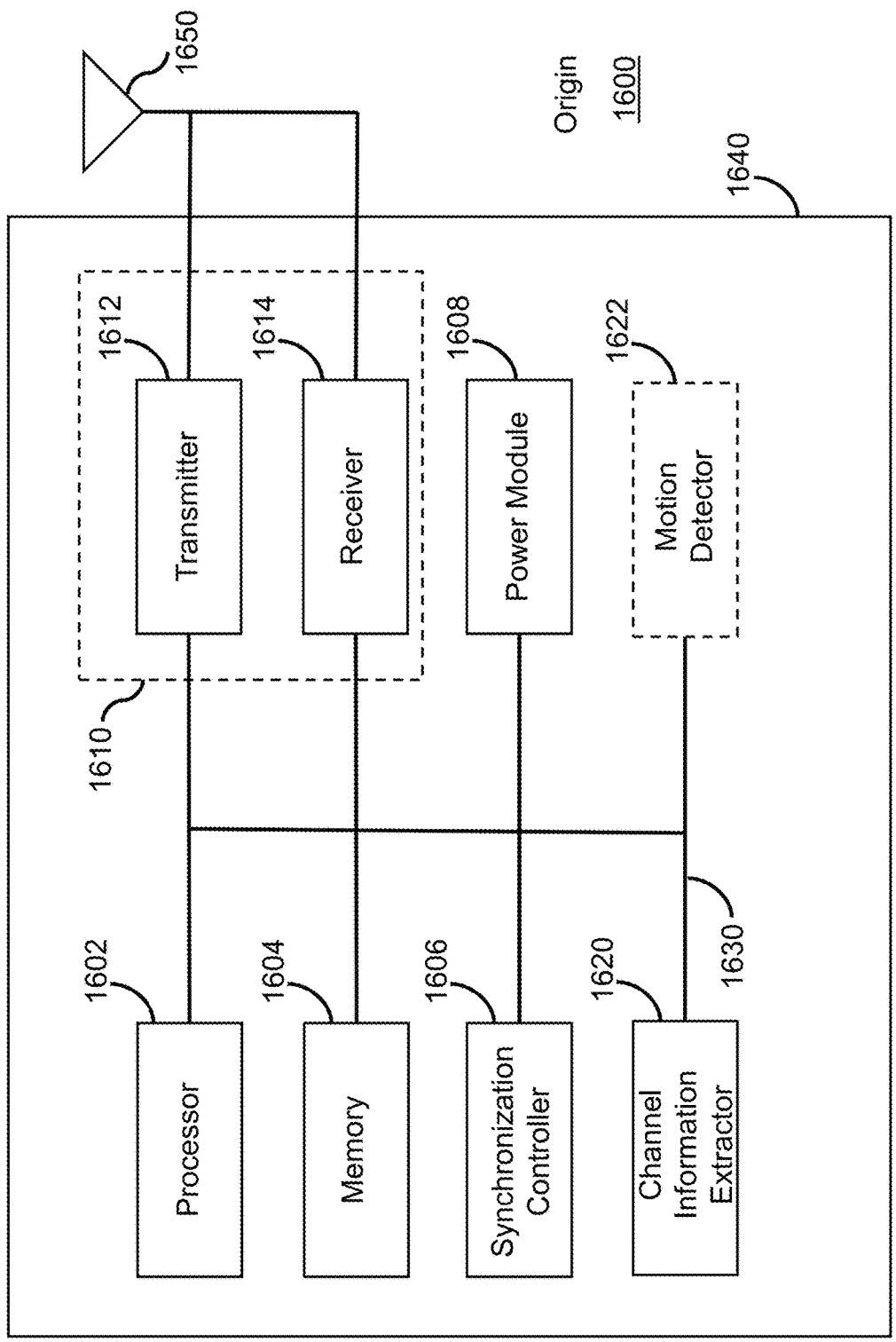
FIG. 16 illustrates an exemplary block diagram of a second wireless device of a system for radio-assisted signal estimation, according to some embodiments of the present disclosure.

FIG. 16 illustrates an exemplary block diagram of a second wireless device, e.g. an Origin 1600, of a system for radio-assisted signal estimation, according to one embodiment of the present teaching. The Origin 1600 is an example of a device that can be configured to implement the various methods described herein. The Origin 1600 in this example may serve as Origin 212 in FIG. 2 for wirelessly sound sensing in a venue. As shown in FIG. 16, the Origin 1600 includes a housing 1640 containing a processor 1602, a memory 1604, a transceiver 1610 comprising a transmitter 1612 and a receiver 1614, a power module 1608, a synchronization controller 1606, a channel information extractor 1620, and an optional motion detector 1622.

In this embodiment, the processor 1602, the memory 1604, the transceiver 1610 and the power module 1608 work similarly to the processor 1502, the memory 1504, the transceiver 1510 and the power module 1508 in the Bot 1500. An antenna 1650 or a multi-antenna array 1650 is typically attached to the housing 1640 and electrically coupled to the transceiver 1610.

The Origin 1600 may be a second wireless device that has a different type from that of the first wireless device (e.g. the Bot 1500). In particular, the channel information extractor 1620 in the Origin 1600 is configured for receiving the wireless signal through the wireless channel, and obtaining a time series of channel information (CI) of the wireless channel based on the wireless signal. The channel information extractor 1620 may send the extracted CI to the optional motion detector 1622 or to a motion detector outside the Origin 1600 for wireless sound sensing in the venue.

The motion detector 1622 is an optional component in the Origin 1600. In one embodiment, it is within the Origin 1600 as shown in FIG. 16. In another embodiment, it is outside the Origin 1600 and in another device, which may be a Bot, another Origin, a cloud server, a fog server, a local server, and an edge server. The optional motion detector 1622 may be configured for detecting sound information from a vibrating object or source in the venue based on motion information. The motion information may be computed based on the time series of CI by the motion detector 1622 or another motion detector outside the Origin 1600.

The synchronization controller 1606 in this example may be configured to control the operations of the Origin 1600 to be synchronized or un-synchronized with another device, e.g. a Bot, another Origin, or an independent motion detector. In one embodiment, the synchronization controller 1606 may control the Origin 1600 to be synchronized with a Bot that transmits a wireless signal. In another embodiment, the synchronization controller 1606 may control the Origin 1600 to receive the wireless signal asynchronously with other Origins. In another embodiment, each of the Origin 1600 and other Origins may receive the wireless signals individually and asynchronously. In one embodiment, the optional motion detector 1622 or a motion detector outside the Origin 1600 is configured for asynchronously computing respective heterogeneous motion information based on the respective time series of CI.

The various modules discussed above are coupled together by a bus system 1630. The bus system 1630 can include a data bus and, for example, a power bus, a control signal bus, and/or a status signal bus in addition to the data bus. It is understood that the modules of the Origin 1600 can be operatively coupled to one another using any suitable techniques and mediums.

Although a number of separate modules or components are illustrated in FIG. 16, persons of ordinary skill in the art will understand that one or more of the modules can be combined or commonly implemented. For example, the processor 1602 can implement not only the functionality described above with respect to the processor 1602, but also implement the functionality described above with respect to the channel information extractor 1620. Conversely, each of the modules illustrated in FIG. 16 can be implemented using a plurality of separate components or elements.

Figure 17:
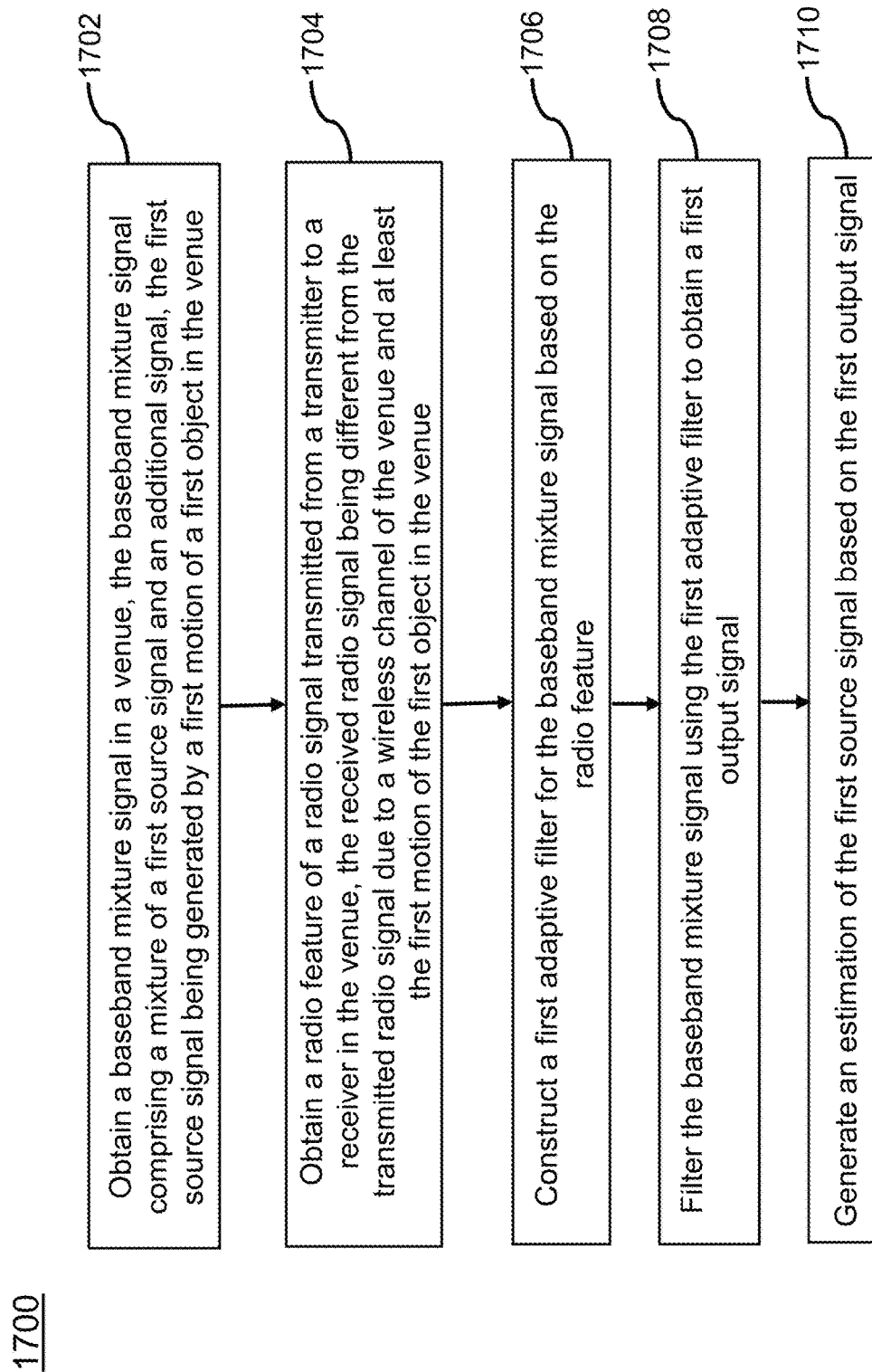
FIG. 17 illustrates a flow chart of an exemplary method for radio-assisted signal estimation, according to some embodiments of the present disclosure.

FIG. 17 illustrates a flow chart of an exemplary method 1700 for radio-assisted signal estimation, according to some embodiments of the present disclosure. In various embodiments, the method 1700 can be performed by the systems disclosed above. At operation 1702, a baseband mixture signal in a venue is obtained. The baseband mixture signal comprises a mixture of a first source signal and an additional signal. The first source signal is generated by a first motion of a first object in the venue. At operation 1704, a radio feature of a radio signal is obtained. The radio signal is transmitted from a transmitter to a receiver in the venue. The received radio signal differs from the transmitted radio signal due to a wireless channel of the venue and at least the first motion of the first object in the venue. At operation 1706, a first adaptive filter is constructed for the baseband mixture signal based on the radio feature. At operation 1708, the baseband mixture signal is filtered using the first adaptive filter to obtain a first output signal. At operation 1710, an estimation of the first source signal is generated based on the first output signal. The order of the operations in FIG. 17 may be changed according to various embodiments of the present teaching.

Figure 18:
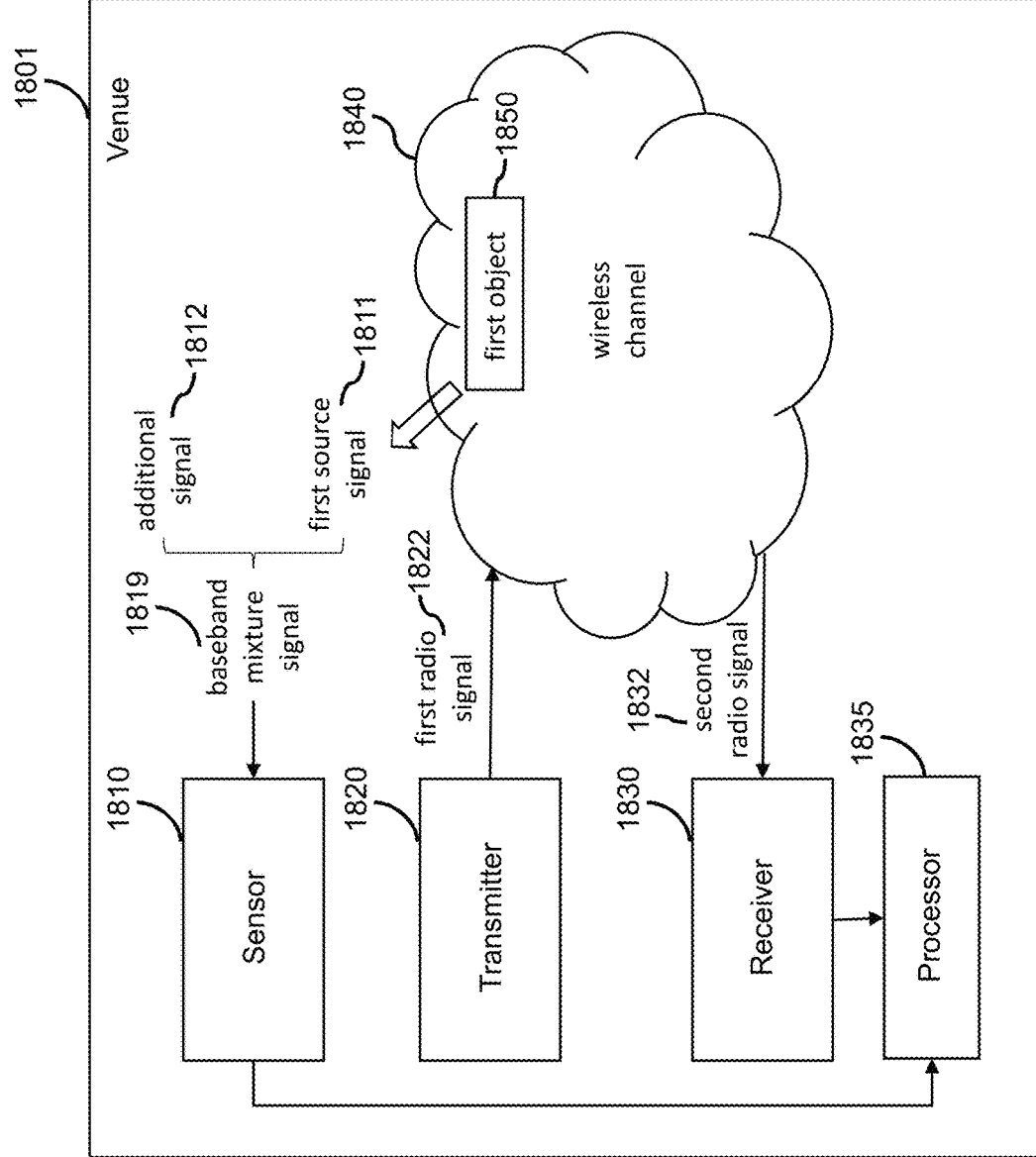
FIG. 18 illustrates a system for radio-assisted signal estimation, according to some embodiments of the present disclosure.

FIG. 18 illustrates a system 1800 for radio-assisted signal estimation in a venue 1801, according to some embodiments of the present disclosure. As shown in FIG. 18, the system 1800 includes a sensor 1810 configured to obtain a baseband mixture signal 1819 in the venue 1801. In some embodiments, the sensor 1810 may be a microphone (e.g. a microphone on a smart speaker) for acoustic sensing. In some embodiments, the baseband mixture signal 1819 comprises a mixture of a first source signal 1811 and an additional signal 1812. In some embodiments, the first source signal 1811 is generated by a first motion of a first object 1850 in the venue 1801.

As shown in FIG. 18, the system 1800 also includes a transmitter 1820 configured to transmit a first radio signal 1822 through a wireless channel 1840 of the venue 1801; and a receiver 1830 configured to receive a second radio signal 1832 through the wireless channel 1840. In some embodiments, the second radio signal 1832 differs from the first radio signal 1822 due to the wireless channel 1840 and at least the first motion of the first object 1850 in the venue 1801. In some embodiments, the transmitter 1820 may be a wireless transmitter or Bot as shown in FIG. 2 and/or FIG. 15. In some embodiments, the receiver 1830 may be a wireless receiver or Origin as shown in FIG. 2 and/or FIG. 16.

As shown in FIG. 18, the system 1800 also includes a processor 1835 configured for generating an estimation of the first source signal, based on the baseband mixture signal 1819 from the sensor 1810 and the second radio signal 1832 from the receiver 1830, e.g. following method disclosed in FIG. 17. In some embodiments, the processor 1835 may be a separate device from the receiver 1830. In other embodiments, the processor 1835 may be a device coupled to or integrated with the receiver 1830.

Figure 19:
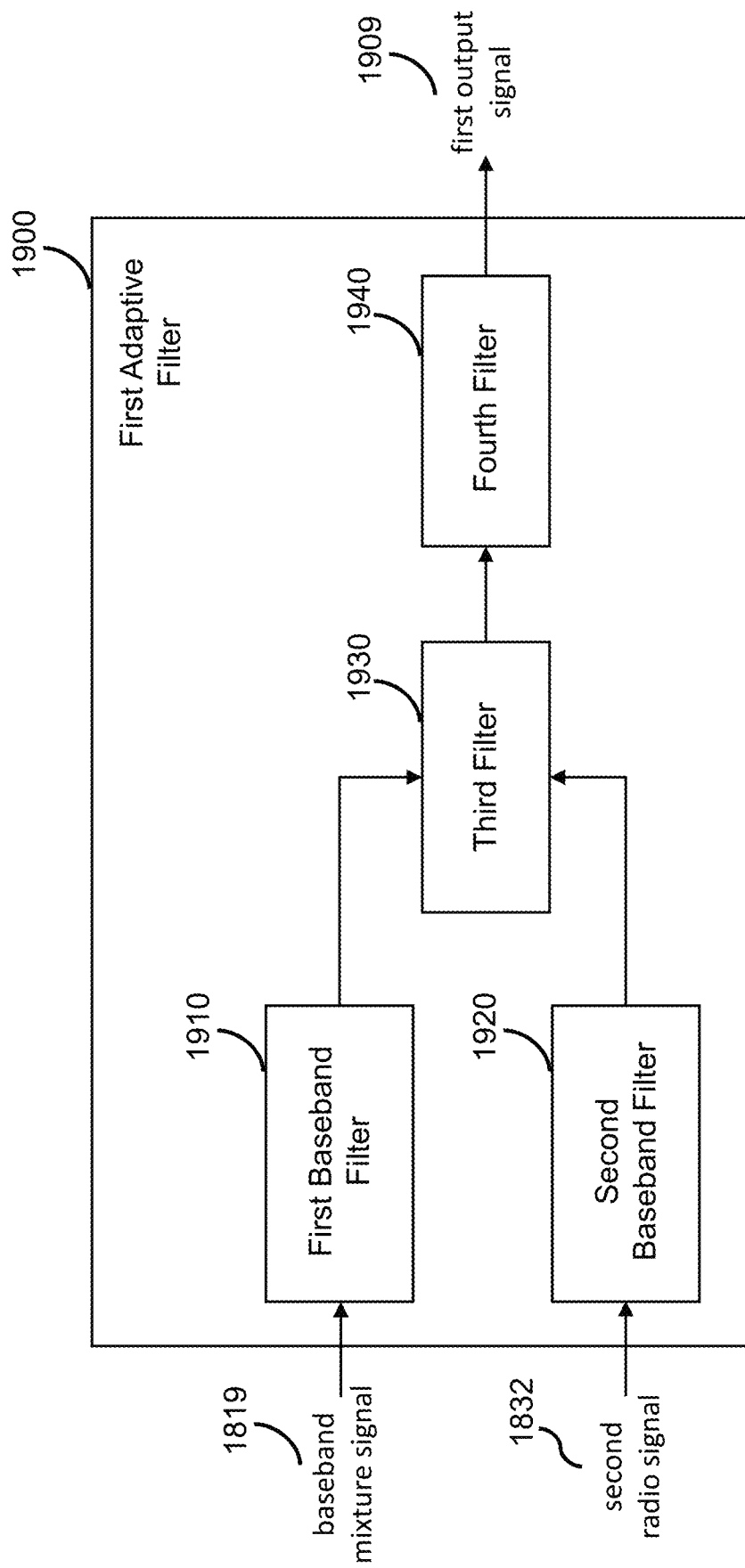
FIG. 19 illustrates a first adaptive filter in a system for radio-assisted signal estimation, according to some embodiments of the present disclosure.

FIG. 19 illustrates a first adaptive filter 1900 in a system, e.g. the system 1800 in FIG. 18, for radio-assisted signal estimation, according to some embodiments of the present disclosure. In other embodiments, the first adaptive filter 1900 may be constructed by the processor 1835 for the baseband mixture signal 1819 based on a radio feature of the second radio signal 1832. The first adaptive filter 1900 may be used to filter the baseband mixture signal 1819 to obtain a first output signal 1909, such that the processor 1835 of the system can generate an estimation of the first source signal 1811 based on the first output signal 1909.

As shown in FIG. 19, the first adaptive filter 1900 includes a first baseband filter 1910, a second baseband filter 1920, a third filter 1930 and a fourth filter 1940. The first baseband filter 1910 may be constructed without using the radio feature of the second radio signal 1832. The second baseband filter 1920 may be constructed based on the radio feature of the second radio signal 1832.

Figure 20:
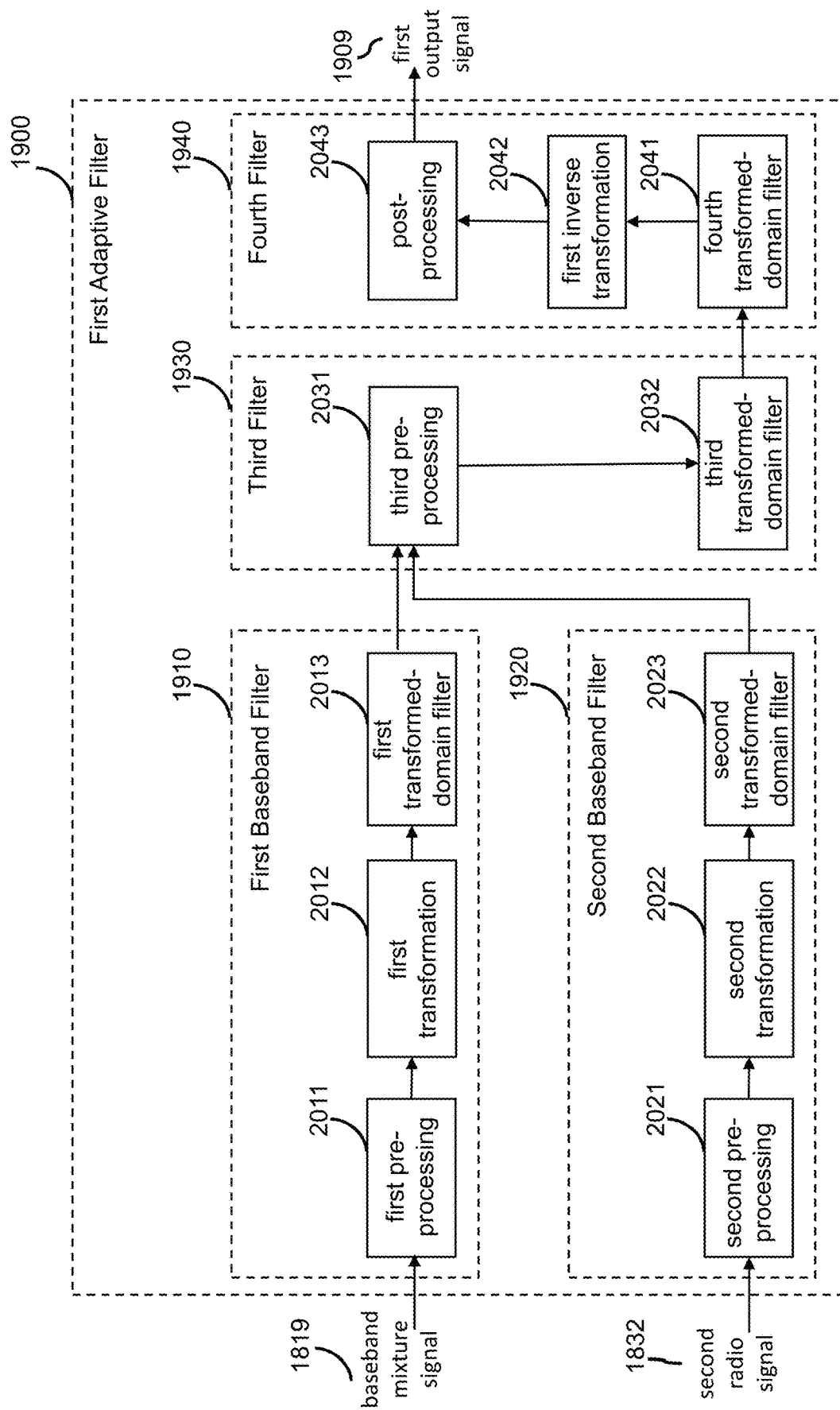
FIG. 20 illustrates a detailed diagram of a first adaptive filter in a system for radio-assisted signal estimation, according to some embodiments of the present disclosure.

FIG. 20 illustrates a detailed diagram of the first adaptive filter 1900, according to some embodiments of the present disclosure. In this example, as shown in FIG. 20, the first baseband filter 1910 further includes: a first pre-processing module 2011 for processing the baseband mixture signal 1819 in a first signal domain, a first transformation module 2012 for transforming signal from the first signal domain to a first transformed domain, and a first transformed-domain filter 2013 to filter signal in the first transformed domain. In this example, as shown in FIG. 20, the second baseband filter 1920 further includes: a second pre-processing module 2021 for processing the second radio signal 1832 in a second signal domain, a second transformation module 2022 for transforming signal from the second signal domain to a second transformed domain, and a second transformed-domain filter 2023 to filter signal in the second transformed domain.

As shown in FIG. 20, the third filter 1930 in this example comprises: a third pre-processing module 2031 for processing outputs of the first baseband filter 1910 and the second baseband filter 1920, and a third transformed-domain filter 2032 for filtering signal in a third signal domain. As shown in FIG. 20, the fourth filter 1940 in this example comprises: a fourth transformed-domain filter 2041 to filter signal in the first transformed domain based on output of the third transformed-domain filter 2032, a first inverse transformation module 2042 to transform signal from the first transformed domain to the first signal domain, and a post-processing module 2043 to process signal in the first signal domain to generate the first output signal 1909, for estimation of the first source signal 1811.

In some embodiments, a wireless signal (e.g. mmWave, 28 GHz or 60 GHz, or radar signal, or UWB signal) between a transmitter and a receiver may be used to assist in signal (e.g. speech) enhancement (e.g. denoising) and/or signal separation, based on channel information (e.g. channel impulse response/CIR, channel frequency response/CFR, and/or channel state information/CSI, RSSI, etc) obtained from the received wireless signal. The transmitter and the receiver may be co-located (e.g. on the same device, or on the same circuit board), or at different locations.

In some embodiments, the transmitter (Type1 device) and/or receiver (Type2 device) may each have an antenna array, distributed antennas. There may be multiple receivers each receiving the wireless signal from the transmitter. There may be multiple transmitters each transmitting a respectively wireless signal to the receiver. There may be multiple transmitters and multiple receivers, each transmitter transmitting a respectively wireless signal to one or more receivers.

In some embodiments, the device implementing the disclosed system may have a commodity wireless networking or communication chip/chipset which may operate in a radar mode. The radar mode may be enabled by attaching an extra antenna array to the chipset. It may use the chip/chipset to transmit the wireless signal using a transmitting radio, and to receive the reflected wireless signal using a receiving radio. The chip may transmit/receive simultaneously or contemporaneously. The chip may switch rapidly between transmit and receive to simulate or mimic "simultaneous" transmit/receive.

In some embodiments, the transmitters and receivers may be in a same venue (e.g. a home, a room, an office, a walkway, a common area, a facility). The transmitters may be physically next to, adjacent to, or at a distance from, the receivers. At least one object or "source" object (e.g. a person, two people or more than two people) may be present in the venue each generating a respective source signal (e.g. speech signal from each person, talking, singing, dialog, one-at-a-time speech, simultaneous two or more people talking). A mixture signal may be obtained (e.g. sound captured by microphone containing simultaneous dialog/singing of two people). The mixture signal may comprise a mixture (e.g. a sum, weighted sum, product, weighted product, etc.) of the signals from the at least one source. The source signal may be generated in the presence of background noise (e.g. two people speaking in a noisy environment, e.g. train station, airport, or a home/office; background noise may be crowd sound, mechanical sound, motor/engine sound, vacuum cleaner/fan/machine/refrigerator/heater/air conditioner).

In some embodiments, the goal of signal separation is to separate more than one source signals (e.g. sound signal) in/from the mixture signal. The goal of signal enhancement is to enhance the individual source signals (e.g. improve intelligibility, improve voice quality, reduce/remove noise).

In some embodiments, a method for radio-assisted signal estimation includes steps s1 to s5 as described below.

At step s1: obtain the mixture signal associated with a sensor (e.g. sound signal captured by a microphone) which comprises a mixture of at least one source signal associated with at least one object in the venue, each source signal from/associated with a respective object in the venue.

At step s2: transmit a wireless signal (e.g. mmWave signal or radar signal, or UWB signal) from Type1 device to Type2 device; obtain more than one time series of channel information (TSCI, with CI being/comprising one or more of CIR, CFR, or CSI, or RSSI, etc.) from received wireless signal, each CI associated with a respective transmitter antenna and a respective receiver antenna. The transmitter antennas and/or receiver antennas may be at known locations. Each CI (e.g. CIR) comprises more than one component, each component being associated with a propagation delay or a range or a range bin. Each component may be a complex number.

At step s3: apply digital beamforming on the TSCI to obtain more than one range-azimuth CIR, each CIR is associated with a range and an azimuth.

At step s4: generate at least one radio signal, CIR Tap(t), each associated with a respective object (speaker) in the venue by the following steps s4a to s4e. At step s4a, CFAR (constant false alarm rate) detector is used for target detection, e.g. target is detected when Tap of CIR>T1. At step s4b, for clutter removal, one may retain a CIP tap if T2<Variance of CIR Tap (over time)<T3, where both T2 and T3 spatially varying w.r.t. {r, theta}. At step s4c, for estimation of number of object (e.g. people), non-parametric clustering (DBSCAN) may be used. At step s4d, continuous tracking of user locations {r, theta} may be performed. At step s4e, for radio feature extraction, CIR tap (a time function) at {r, theta} may be associated with user location {r, theta}, wherein median binning is performed.

At step s5: simultaneous separate and enhance the mixture signal based on a combination of SES and radio feature. The Basic SES may include: an encoder (STFT, or similar), a compute mask (filter), an apply mask (filter), and a decoder (ISTFT, or similar). The front end processing for radio feature (i.e. CIR tap (a time function) at {r, theta}) may include the following steps s5a to s5h. At step s5a, random rotation of CIR tap(t) in IQ plane may be optionally performed. At step s5b, high-pass filter is used to reduce effect of body motion (cutoff freq at 90 Hz in order not to filter vocal folds harmonics). At step s5c, an adaptive encoder (STFT-like) is constructed and used.

At step s5d, process audio and radio stream separately with individual blocks to exploit long-term dependency within each modality, where each modality may be processed through dual-path RNN block (DPRNN)—deep learning. After resizing, fuse audio and radio signals by vector concatenation. Then processing with four more DPRNN blocks may be applied before estimating the mask with a 2D convolutional layer. DPRNN processing may include reshaping the input data to a 3D representation, through means of extracting overlapping blocks, concatenating through another dimension, and applying two consecutive RNN layers to different dimensions of input block.

At step s5e, train a mask for each person based on the estimated number of people. At step s5f, apply the mask to audio, e.g. by applying mask1 to extract speaker1's speech and applying mask2 to extract speaker2's speech. At step s5g, a decoder (block-by-block) is applied. At step s5h, overlap and addition are performed.

The following numbered clauses provide implementation examples for sound sensing based on audio and radio signals.

Clause 1. A method/device/system/software of a radio-assisted signal processing system, comprising: obtaining a baseband mixture signal in a venue, wherein the baseband mixture signal comprises a mixture of a first source signal and another signal, wherein a source of the first source signal is a motion of an object in the venue; constructing a first adaptive filter for the baseband mixture signal based on a radio feature of a radio signal transmitted from a Type1 heterogeneous wireless device to a Type2 heterogeneous wireless device in the venue, wherein the received radio signal differs from the transmitted radio signal due to the motion of the object and a wireless multipath channel of the venue; filtering the baseband mixture signal using the first adaptive filter to obtain a first output signal which is an estimation of the first source signal.

In some embodiments, the total processing/filtering may comprise: (1) stage-1 filtering, (2) stage-2 filter and (3) stage-3 filtering. Referring to FIG. 9, stage-1 filter has two parts: one part (called "1a") for filtering the baseband mixture (e.g. sound) signal, and one part (called "1b") for filtering the "radar output" in FIG. 9.

(1a) The stage-1a filter corresponds to 3 bottom blocks for processing baseband mixture signal (e.g. sound) in FIG. 9: the "Mic output" block, the "Adaptive Encoder (Audio Feature)" block, and the "Audio Preprocessing (Audio DPRNN(×2))" block. The processing by stage-1a filter includes: preprocessing (e.g. nothing, filtering, downsampling); transformation (e.g. transform, convolution, projection) from time domain to transformed domain (e.g. STFT-like domain, frequency domain); and transformed domain processing (e.g. data reorganization or reshaping, Audio DPRNN(×2)).

(1b) The stage-1b filter corresponds to 3 top blocks for processing baseband radio-derived signal (e.g. radar output, signal derived from radio feature (e.g. CSI, CIR, CFR) of radio signal in claim 1) in FIG. 9: the "Radar output" block, the "Adaptive Encoder (Radio Feature)" block, and the "Radio Preprocessing (Radio DPRNN(×2))" block. The processing by stage-1b filter includes: preprocessing (e.g. random phase rotation, high-pass filter) in signal domain (e.g. time domain); transformation (e.g. transform, convolution, projection) from time domain to transformed domain (e.g. STFT-like domain, frequency domain); and transformed domain processing (e.g. data reorganization/reshaping, Radio DPRNN(×2)).

The stage-1a filter and the stage-1b filter have similar signal processing elements: namely, the time domain, the transformation, the transformed domain, and the transformed domain processing. The baseband radio-derived signal may comprise a tab of a CIR in a particular {range, azimuth} which correspond to the object. To derive the baseband radio-derived signal, object detection may be performed to compute the particular {range, azimuth}, by performing: beamforming in 2D (or 3D) CIR, CFAR detection (e.g. thresholding, C*h>T1), clutter removal (e.g. thresholding, T2>variance>T3), clustering, number of people estimation, center extraction, and/or radio feature extraction.

(2) The stage-2 filter corresponds to the right half of "Masker" block in FIG. 9: the "Multi-model Masker (Fusion+DPRNN(×4))". The processing by stage-2 filter includes: preprocessing (e.g. fusion of multi-modal data (e.g. sound data+radio data), fusion of output of stage-1a and stage-1b filters, data concatenation, transformed domain processing (e.g. data reorganization/reshaping, DPRNN(×4)), generation of transformed domain "target" filter (e.g. "Mask", "Audio Mask 1", "Audio Mask 2") for each of the source signals in the baseband mixture signal (e.g. Audio Mask 1 for first sound signal, Audio Mask 2 for second sound signal).

(3) The stage-3 filter corresponds to last three top blocks in FIG. 9 to generate the first output signal as an estimate of baseband source signal: the "Output (Audio Mask1)" block, the application of the mask (functions as a block, though not shown in block form in FIG. 9), and the "Adaptive Decoder" block. The processing by stage-3 filter includes: filtering the baseband mixture signal using the transformed domain "target" filter, inverse transform, overlap and add to reconstruct time domain output as an estimate of the baseband source signal.

Clause 2. The method/device/system/software of the radio-assisted signal processing system of clause 1, further comprising: constructing a first baseband stage-1 filter without using the radio feature of the radio signal; constructing a second baseband stage-1 filter based on the radio feature of the radio signal; constructing the first adaptive filter based on the first baseband stage-1 filter, the second baseband stage-1 filter, a stage-2 filter and a stage-3 filter.

Clause 3. The method/device/system/software of the radio-assisted signal processing system of clause 2, wherein the second baseband stage-1 filter comprises at least one signal processing element similar to that of the first baseband stage-1 filter.

Clause 4. The method/device/system/software of the radio-assisted signal processing system of clause 2, wherein the first baseband stage-1 filter comprises: a first preprocessing in a first signal domain, a first transformation from the first signal domain to a first transformed domain, a first transformed-domain filter in the first transformed domain; wherein the second baseband stage-1 filter comprises: a second pre-processing in a second signal domain, a second transformation from the second signal domain to a second transformed domain, a second transformed-domain filter in the second transformed domain; wherein the stage-2 filter comprises: a third pre-processing based on outputs of the stage-1 filters, a third transformed-domain filter in a third domain; wherein the stage-3 filter comprises: a fourth transformed-domain filter in the first transformed domain based on output of the third transformed-domain filter, a first inverse transformation from the first transformed domain to the first signal domain, a post-processing in the first signal domain.

Clause 5. The method/device/system/software of the radio-assisted signal processing system of clause 4, wherein at least one of the following pairs of signal processing elements of the first adaptive baseband filter and the second adaptive baseband filter are similar: the pair of the first signal domain and the second signal domain, the pair of the first transformed domain and the second transformed domain, the pair of the first transformation and the second transformation, and the pair of the first transformed-domain filter and the second transformed-domain filter.

Clause 6. The method/device/system/software of the radio-assisted signal processing system of clause 4, wherein at least one of the first pre-processing, the second pre-processing or the third pre-processing comprises at least one of: feature extraction, magnitude computation, phase computation, distance computation, variation computation, norm computation, quantization, vector quantization, histogram, decomposition, projection, orthogonal projection, overcomplete projection, eigen-decomposition, singular value decomposition (SVD), principal component analysis (PCA), independent component analysis (ICA), compressive sensing, spectral analysis, transform, low-pass filter, band-pass filter, high-pass filter, linear filter, non-linear filter, finite impulse response (FIR) filter, infinite impulse response (IIR) filter, moving average (MA) filter, autoregressive (AR) filter, ARMA filter, adaptive filter, interpolation, decimation, resampling, subsampling, upsampling, folding, grouping, sorting, re-ordering, permutation, combination, thresholding, clipping, derivative, integration, maximization, minimization, feature extraction, mean filter, weighted mean, median filter, mode filter, rank filter, quartile filter, percentile filter, convolution, time correction, phase correction, magnitude correction, random rotation in IQ plane, random phase shift, normalization, phase cleaning, magnitude cleaning, matched filter, enhancement, restoration, denoising, smoothing, signal conditioning.

Clause 7. The method/device/system/software of the radio-assisted signal processing system of clause 4, wherein at least one of the first signal domain or the second signal domain is a time domain; wherein at least one of the first transformed domain or the second transformed domain is a frequency-like domain. (time-frequency domain? Would this be better) 8. The method/device/system/software of the radio-assisted signal processing system of clause 4, wherein at least one of the first transformation or the second transformation comprises at least one of: a discrete time transform, adaptive transform, encoder, adaptive encoder, trigonometric transform, Fourier transform, sine transform, cosine transform, Hadamard transform, short-time transform, STFT, wavelet transform, fast transform, STFT-like transformation, eigen-decomposition, principal component analysis (PCA), independent component analysis (ICA), singular value decomposition (SVD), time decomposition, frequency decomposition, time-frequency decomposition, compressive sensing, graph-based transform, spectral analysis, matching pursuit, a projection, orthogonal projection, non-orthogonal projection, over-complete projection, a projection into the frequency-like domain, a number of projection filters each associated with a frequency, a number of kernels, a number of convolutional filters, or the number of convolutional filters followed by another number of convolutional filters.

Clause 9. The method/device/system/software of the radio-assisted signal processing system of clause 4, wherein at least one of the first transformed-domain filter, the second transformed-domain filter, the third transformed-domain filter, or the fourth transformed-domain filter comprises at least one of: a linear filter, non-linear filter, finite impulse response filter, infinite impulse response filter, moving average filter, autoregressive filter, adaptive filter, interpolation, decimation, resampling, subsampling, upsampling, reshaping, concatenation, time-domain filtering, frequency domain filtering, layers of interconnected processing nodes with an input layer, processing layers and an output layer, fuzzy logic, radial basis function network, support vector machine, tensor product network, simulated reality, self-organizing map, genetic algorithm, evolutionary algorithm, generative adversarial network, parallel distributed processing, biologically inspired computing, learning network, training, clustering, machine learning, layer normalization, neural network (NN), multiple NN, artificial NN (ANN), feedforward NN, multi-layered perceptron (MLP), transformer based NN, attention based NN, convolutional NN, evolutionary NN, cellular NN, modular NN, recurrent Hopfield network, recurrent NN, RNN, dual path RNN, DPRNN, DPRNN(×2), DPRNN(×4), DPRNN(×8), time-delayed NN, NN with long short-term memory (LSTM), NN with bidirectional long short-term memory (BLSTM), NN with intra-block, NN with inter-block, fully-connected NN, NN with back propagation, deep neural network, or deep learning network.

Clause 10. The method/device/system/software of the radio-assisted signal processing system of clause 4, wherein the first inverse transformation comprises at least one of: the inverse of the first transformation, a transposed convolution operation; wherein the post-processing comprises at least one of: concatenation, overlap-and-add (OLA), synchronized overlap-and-add (SOLA), overlap-and-save, overlap-and-discard, overlap-and-scrap.

Clause 11. The method/device/system/software of the radio-assisted signal processing system of clause 4, further comprising: filtering the baseband mixture signal in the first signal domain using the first baseband stage-1 filter to generate a first intermediate signal in the first transformed domain; filtering a baseband radio-derived signal in the second signal domain using the second baseband stage-1 filter to generate a second intermediate signal in the second transformed domain, wherein the baseband radio-derived signal is derived from the radio signal based on the radio feature; filtering a combination of the first intermediate signal and the second intermediate signal using the stage-2 filter to construct the fourth transformed-domain filter of the stage-3 filter; filtering a transformed baseband mixture signal using the stage-3 filter to obtain the first output signal which is the estimation of the first source signal, wherein the transformed baseband mixture signal is obtained by preprocessing the baseband mixture signal using the first preprocessing followed by transforming from the first signal domain to the first transformed domain using the first transformation.

Clause 12. The method/device/system/software of the radio-assisted signal processing system of claim 1, 2, 4 or 11, further comprising: wherein the another signal comprises a mixture of a second source signal and yet another signal; constructing a second adaptive filter for the baseband mixture signal based on the radio feature of the radio signal; filtering the baseband mixture signal using the second adaptive filter to obtain a second output signal which is an estimation of the second source signal.

Clause 13. The method/device/system/software of the radio-assisted signal processing system of clause 12, further comprising: constructing the second adaptive filter based on the first baseband stage-1 filter, the second baseband stage-1 filter, another stage-2 filter and another stage-3 filter.

Clause 14. The method/device/system/software of the radio-assisted signal processing system of clause 13, further comprising: wherein the another stage-2 filter comprises: another third pre-processing based on outputs of the stage-1 filters, another third transformed-domain filter in the third domain; wherein the another stage-3 filter comprises: another fourth transformed-domain filter in the first transformed domain based on output of the another third transformed-domain filter, the first inverse transformation from the first transformed domain to the first signal domain, the post-processing in the first signal domain.

Clause 15. The method/device/system/software of the radio-assisted signal processing system of clause 14, further comprising: filtering another baseband radio-derived signal in the second signal domain using the second baseband stage-1 filter to generate another second intermediate signal in the second transformed domain, wherein the another baseband radio-derived signal is derived from the radio signal based on the radio feature; filtering a combination of the first intermediate signal, and the another second intermediate signal using the another stage-2 filter to construct the another fourth transformed-domain filter of the another stage-3 filter; filtering the transformed baseband mixture signal using the another stage-3 filter to obtain the second output signal which is the estimation of the second source signal.

Clause 16. The method/device/system/software of the radio-assisted signal processing system of clause 15, further comprising: filtering a combination of the first intermediate signal, the second intermediate signal and the another second intermediate signal using the another stage-2 filter to construct the fourth transformed-domain filter of the stage-3 filter and the another fourth transformed-domain filter of the another stage-3 filter.

Clause 17. The method/device/system/software of the radio-assisted signal processing system of clause 11, further comprising: obtaining the radio feature which is a number of time series of channel information (TSCI) of the wireless multipath channel based on the received radio signal using a processor, a memory and a set of instructions, wherein each TSCI is associated with a Tx antenna of the Type1 device and a Rx antenna of the Type2 device, wherein the radio signal comprises a series of sounding signals such that each channel information (CI) is associated with a corresponding sounding signal, wherein each CI comprises at least one of: channel state information (CSI), channel impulse response (CIR), channel frequency response (CFR), or received signal strength index (RSSI); deriving the baseband radio-derived signal from the radio signal based on the number of TSCI.

Clause 18. The method/device/system/software of the radio-assisted signal processing system of clause 17, further comprising: performing beamforming based on the number of TSCI; detecting a location of the object, wherein the location is associated with a range and a direction, determining a particular beamformed TSCI associated with the direction, determining a particular tab of each CI of the particular beamformed TSCI associated with the range, deriving the baseband radio-derived signal from the radio signal based on the particular tab of each CI of the particular beamformed TSCI.

Clause 19. The method/device/system/software of the radio-assisted signal processing system of clause 18, further comprising: wherein the another signal comprises a mixture of a second source signal associated with another object in the venue and yet another signal; detecting another location of the another object, wherein the another location is associated with another range and/or another direction; determining another particular beamformed TSCI associated with the another direction; determining another particular tab of each CI of the another particular beamformed TSCI associated with the another range; deriving another baseband radio-derived signal from the radio signal based on the another particular tab of each CI of the another particular beamformed TSCI; constructing a second adaptive filter for the baseband mixture signal based on the another baseband radio-derived signal; filtering the baseband mixture signal using the second adaptive filter to obtain a second output signal which is an estimation of the second source signal.

Clause 20. The method/device/system/software of the radio-assisted signal processing system of clause 1, further comprising: pre-processing the baseband mixture signal in a first signal domain using a first pre-processing; transforming the baseband mixture signal from the first signal domain to a first transformed domain to obtain a transformed baseband mixture signal using a first transformation; filtering the transformed baseband mixture signal in the first transformed domain to obtain a first intermediate signal using a first transformed-domain filter; pre-processing a baseband radio-derived signal in a second signal domain using a second pre-processing, wherein the baseband radio-derived signal is derived from the radio signal based on the radio feature; transforming the baseband radio-derived signal from the second signal domain to a second transformed domain to obtain a transformed baseband radio-derived signal using a second transformation; filtering the transformed baseband radio-derived signal in the second transformed domain to obtain a second intermediate signal using a second transformed-domain filter; pre-processing the transformed baseband mixture signal and the transformed baseband radio-derived signal to obtain a fused signal in a third transformed domain using a third pre-processing; filtering the fused signal in the third domain to obtain a fourth transformed-domain filter using a third transformed-domain filter; filtering the transformed baseband mixture signal in the first transformed domain to obtain a filtered transformed baseband mixture signal using the fourth transformed-domain filter; transforming the filtered transformed baseband mixture signal from the first transformed domain to the first signal domain using an inverse of the first transformation to obtain the first output signal which is the estimation of the first source signal; post-processing the first output signal.

Clause 21. The method/device/system/software of the radio-assisted signal processing system of clause 4, wherein the first signal domain is a time domain associated with a first sampling rate; wherein the second signal domain is a time domain associated with a second sampling rate.

Clause 22. The method/device/system/software of the radio-assisted signal processing system of clause 1, wherein: the radio signal is at least one of: a radio signal with a carrier frequency larger than 10 GHz, a millimeter wave radio signal, a radio signal with a bandwidth larger than 200 MHz, a WLAN signal, a WiFi signal, a wireless communication signal, an ultra-wide band (UWB) radio signal, a radar signal.

Clause 23. The method/device/system/software of the radio-assisted signal processing system of clause 1, wherein: the first object is a first person, the first source signal comprises at least one of: a sound, a dialog signal, a speech signal, a singing sound, an activity sound, a musical sound, an instrument sound, a man-made sound, a machine sound, a mechanical sound, a playback sound, a speaker sound, a synthesized sound, an audio signal, a visual signal, a light intensity signal, an image, a video, an imaging, a baseband sound signal captured based on a microphone, an visual signal captured based on a camera sensor, an imaging signal captured based on an imaging sensor, or a baseband sensing signal obtained based on a sensor.

Clause 24. The method/device/system/software of the radio-assisted signal processing system of clause 1, wherein: the another signal comprises at least one of: background noise, a mixture of multiple signals, household sound, mechanical sound, instrument sound, machine sound, vacuum cleaner sound, fan sound, heater sound, air conditioning sound, television sound, radio sound, audio sound, speaker sound, play-backed sound, musical sound, environment sound, air sound, wind sound, traffic sound, tree sound, window sound, door sound, human activity sound, cooking sound, work sound, play sound, tool sound, toy sound, human chattering, laughter, a baseband signal generated a second object, a baseband sound signal associated with a second motion of a second person.

Clause 25. The method/device/system/software of the radio-assisted signal processing system of clause 1, further comprising: processing the first output signal for a task associated with the object.

Clause 26. The method/device/system/software of the radio-assisted signal processing system of clause 1, wherein: the radio signal is obtained using the radio receiver of the Type2 device; the baseband mixture signal is obtained using a sensor of a different kind from the radio receiver.

Clause 27. The method/device/system/software of the radio-assisted signal processing system of clause 1, wherein: the radio signal is obtained using a radio receiver of the Type2 device; the baseband mixture signal is obtained using a sensor which is not a radio receiver.

Clause 28. The method/device/system/software of the radio-assisted signal processing system of clause 1, wherein: the radio signal is obtained using a radio receiver of the Type2 device; the baseband mixture signal is obtained using a sensor which does not comprise a radio component.

Clause 29. The method/device/system/software of the radio-assisted signal processing system of clause 1, wherein: the baseband mixture signal is obtained using a baseband sensor; the radio signal is obtained using a sensor of a different kind from baseband sensor.

Clause 30. The method/device/system/software of the radio-assisted signal processing system of clause 1, wherein: the baseband mixture signal is obtained using a baseband sensor; the radio signal is obtained using a sensor which is not a baseband sensor.

Clause 31. The method/device/system/software of the radio-assisted signal processing system of clause 26 to 30, wherein: the first adaptive filter comprises a multimodal fusion of the radio signal and the baseband mixture signal.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for radio-assisted signal estimation, comprising:
   a sensor configured to sense a baseband mixture signal in a venue, wherein:
      the baseband mixture signal comprises a mixture of a first source signal and an additional signal,
      the first source signal is generated by a first motion of a first object in the venue,
      the baseband mixture signal is a baseband signal that has not been modulated to a radio frequency;
   a transmitter configured to transmit a first radio signal through a wireless channel of the venue;
   a receiver configured to receive a second radio signal through the wireless channel, wherein the second radio signal differs from the first radio signal due to the wireless channel and at least the first motion of the first object in the venue, wherein both the first radio signal and the second radio signal are not baseband signals; and
   a processor configured for:
      obtaining a baseband radio-derived signal based on a radio feature of the second radio signal,
      configuring a first adaptive filter for the baseband mixture signal based on the baseband radio-derived signal, wherein configuring the first adaptive filter comprises:
         configuring a first baseband filter for the baseband mixture signal, wherein the first baseband filter comprises: a first pre-processing in a first signal domain, a first transformation from the first signal domain to a first transformed domain, and a first transformed-domain filter in the first transformed domain,
         configuring a second baseband filter for the baseband radio-derived signal, wherein the second baseband filter comprises: a second pre-processing in a second signal domain, a second transformation from the second signal domain to a second transformed domain, and a second transformed-domain filter in the second transformed domain, and configuring the first adaptive filter based on the first baseband filter, the second baseband filter, a third filter and a fourth filter, wherein:
  the third filter comprises: a third pre-processing based on outputs of the first and second baseband filters, and a third transformed-domain filter in a third signal domain,
  the third pre-processing comprises combining a first vector output from the first baseband filter in the first transformed domain with a second vector output from the second baseband filter in the second transformed domain to generate a combined signal in the third signal domain, and
  the fourth filter comprises: a fourth transformed-domain filter in the first transformed domain based on output of the third transformed-domain filter, a first inverse transformation from the first transformed domain to the first signal domain, and a post-processing in the first signal domain,
filtering the baseband mixture signal using the first adaptive filter to obtain a first output signal, and
generating an estimation of the first source signal based on the first output signal.

2. The system of claim 1, wherein configuring the first adaptive filter comprises:
configuring the first baseband filter without using the radio feature of the second radio signal; and
configuring the second baseband filter based on the radio feature of the second radio signal, wherein the second baseband filter comprises at least one signal processing element similar to that of the first baseband filter.

3. The system of claim 1, wherein:
at least one of the first pre-processing, the second pre-processing or the third pre-processing comprises at least one of: feature extraction, magnitude computation, high-pass filter, random rotation in IQ plane, phase cleaning, or magnitude cleaning;
at least one of the first signal domain or the second signal domain is a time domain; and
at least one of the first transformed domain or the second transformed domain is a time-frequency domain.

4. The system of claim 3, wherein:
at least one of the first transformation or the second transformation comprises at least one of: an adaptive encoder, a short-time Fourier transform, a projection into the time-frequency domain, a number of kernels, a number of convolutional filters, or the number of convolutional filters followed by another number of convolutional filters;
at least one of the first transformed-domain filter, the second transformed-domain filter, the third transformed-domain filter, or the fourth transformed-domain filter comprises at least one of: reshaping, concatenation, neural network, dual-path recurrent neural network, neural network with bidirectional long short-term memory, or deep neural network;
the first inverse transformation comprises at least one of: an inverse of the first transformation, or a transposed convolution operation;
the post-processing comprises at least one of: concatenation, overlap-and-add (OLA), synchronized overlap-and-add (SOLA), overlap-and-save, overlap-and-discard, or overlap-and-scrap.

5. The system of claim 4, wherein filtering the baseband mixture signal using the first adaptive filter comprises:
  filtering the baseband mixture signal in the first signal domain using the first baseband filter to generate a first intermediate signal in the first transformed domain;
  filtering the baseband radio-derived signal in the second signal domain using the second baseband filter to generate a second intermediate signal in the second transformed domain, wherein the baseband radio-derived signal is derived from the second radio signal based on the radio feature;
  filtering a combination of the first intermediate signal and the second intermediate signal using the third filter to configure the fourth transformed-domain filter of the fourth filter; and
  filtering a transformed baseband mixture signal using the fourth filter to obtain the first output signal, wherein the transformed baseband mixture signal is obtained by preprocessing the baseband mixture signal using the first pre-processing followed by transforming from the first signal domain to the first transformed domain using the first transformation.

6. The system of claim 5, wherein:
the additional signal comprises a mixture of a second source signal and a third signal;
the second source signal is generated by a second motion of a second object in the venue;
the second radio signal differs from the first radio signal due to: the wireless channel, the first motion of the first object, and the second motion of the second object;
the processor is further configured for:
  configuring a second adaptive filter for the baseband mixture signal based on an additional baseband radio-derived signal derived based on a second tab of each CI of a second beamformed TSCI of the radio feature, the second beamformed TSCI of the radio feature being associated with a second direction of the second object, the second tab being associated with a second range of the second object,
  filtering the baseband mixture signal using the second adaptive filter to obtain a second output signal, and
  generating an estimation of the second source signal based on the second output signal.

7. The system of claim 6, wherein:
the processor is further configured for configuring the second adaptive filter based on the first baseband filter, the second baseband filter, an additional third filter and an additional fourth filter;
the additional third filter comprises: an additional third pre-processing based on outputs of the first and second baseband filters, and an additional third transformed-domain filter in the third signal domain; and
the additional fourth filter comprises: an additional fourth transformed-domain filter in the first transformed domain based on output of the additional third transformed-domain filter, the first inverse transformation from the first transformed domain to the first signal domain, and the post-processing in the first signal domain.

8. The system of claim 7, wherein filtering the baseband mixture signal using the second adaptive filter comprises:
  filtering the additional baseband radio-derived signal in the second signal domain using the second baseband filter to generate an additional second intermediate signal in the second transformed domain, wherein the additional baseband radio-derived signal is derived from the second radio signal based on the radio feature;
  filtering a combination of the first intermediate signal, and the additional second intermediate signal using the additional third filter to configure the additional fourth transformed-domain filter of the additional fourth filter; and filtering the transformed baseband mixture signal using the additional fourth filter to obtain the second output signal.

9. The system of claim 8, wherein the processor is further configured for:

filtering a combination of the first intermediate signal, the second intermediate signal and the additional second intermediate signal using the additional third filter to configure the fourth transformed-domain filter of the fourth filter and the additional fourth transformed-domain filter of the additional fourth filter.

10. The system of claim 9, wherein the processor is further configured for:

obtaining, based on the second radio signal, the radio feature comprising a number of time series of channel information (TSCI) of the wireless channel, wherein:
  each TSCI is associated with a transmit antenna of the transmitter and a receive antenna of the receiver,
  the second radio signal comprises a series of sounding signals such that each channel information (CI) is associated with a corresponding sounding signal,
  each CI comprises at least one of: channel state information (CSI), channel impulse response (CIR), channel frequency response (CFR), or received signal strength index (RSSI); and
deriving the baseband radio-derived signal from the second radio signal based on the number of TSCI.

11. The system of claim 10, wherein the processor is further configured for:

performing beamforming based on the number of TSCI;
detecting a first location of the first object, wherein the first location is associated with a first range and a first direction;
determining a first beamformed TSCI associated with the first direction;
determining a first tab of each CI of the first beamformed TSCI associated with the first range; and
deriving the baseband radio-derived signal from the second radio signal based on the first tab of each CI of the first beamformed TSCI.

12. The system of claim 11, wherein the processor is further configured for:

detecting a second location of the second object, wherein the second location is associated with a second range and/or a second direction;
determining a second beamformed TSCI associated with the second direction;
determining a second tab of each CI of the second beamformed TSCI associated with the second range;
deriving the additional baseband radio-derived signal from the second radio signal based on the second tab of each CI of the second beamformed TSCI; and
configuring the second adaptive filter for the baseband mixture signal based on the additional baseband radio-derived signal.

13. The system of claim 12, wherein:

the first signal domain is a time domain associated with a first sampling rate;
the second signal domain is a time domain associated with a second sampling rate; and
the second radio signal is at least one of: a radio signal with a carrier frequency larger than 10 GHz, a millimeter wave radio signal, a radio signal with a bandwidth larger than 200 MHz, a WLAN signal, a WiFi signal, a wireless communication signal, an ultra-wide band (UWB) radio signal, or a radar signal.

14. The system of claim 13, wherein:

the first object is at least one of: a first person actively generating the first source signal, a first device actively outputting the first source signal, or an object passively vibrating according to the first source signal; and
the first source signal comprises at least one of: a sound, a speech signal, a musical sound, an instrument sound, a man-made sound, a machine sound, a synthesized sound, an audio signal, a visual signal, an imaging signal, or a baseband sensing signal.

15. The system of claim 14, wherein the additional signal comprises at least one of:

background noise, household sound or environment sound.

16. The system of claim 15, wherein the processor is further configured for:

processing the first output signal for a task associated with the first object.

17. The system of claim 16, wherein:

the sensor does not comprise any radio component.

18. The system of claim 16, wherein:

the sensor is a baseband sensor; and
the receiver comprises another sensor which is a different kind from the baseband sensor and is configured to receive the second radio signal.

19. The system of claim 16, wherein:

the first adaptive filter comprises a multimodal fusion of the second radio signal and the baseband mixture signal.

20. The system of claim 16, wherein:

the transmitter and the receiver are physically coupled to each other.

21. The system of claim 20, wherein:

the sensor is not physically coupled to the transmitter or the receiver.

22. The system of claim 20, wherein:

the processor is communicatively coupled to the receiver.

23. A method for radio-assisted signal estimation, comprising:

sensing a baseband mixture signal in a venue, wherein:
  the baseband mixture signal comprises a mixture of a first source signal and an additional signal,
  the first source signal is generated by a first motion of a first object in the venue,
  the baseband mixture signal is a baseband signal that has not been modulated to a radio frequency;
obtaining a baseband radio-derived signal based on a radio feature of a radio signal transmitted from a transmitter to a receiver through a wireless channel in the venue, wherein the received radio signal differs from the transmitted radio signal due to the wireless channel and at least the first motion of the first object in the venue, wherein both the transmitted radio signal and the received radio signal are not baseband signals;
configuring a first adaptive filter for the baseband mixture signal based on the baseband radio-derived signal, wherein configuring the first adaptive filter comprises:
  configuring a first baseband filter for the baseband mixture signal, wherein the first baseband filter comprises: a first pre-processing in a first signal domain, a first transformation from the first signal domain to a first transformed domain, and a first transformed-domain filter in the first transformed domain,
  configuring a second baseband filter for the baseband radio-derived signal, wherein the second baseband filter comprises: a second pre-processing in a second signal domain, a second transformation from the second signal domain to a second transformed domain, and a second transformed-domain filter in the second transformed domain, and configuring the first adaptive filter based on the first baseband filter, the second baseband filter, a third filter and a fourth filter, wherein:

the third filter comprises: a third pre-processing based on outputs of the first and second baseband filters, and a third transformed-domain filter in a third signal domain, the third pre-processing comprises combining a first vector output from the first baseband filter in the first transformed domain with a second vector output from the second baseband filter in the second transformed domain to generate a combined signal in the third signal domain, and the fourth filter comprises: a fourth transformed-domain filter in the first transformed domain based on output of the third transformed-domain filter, a first inverse transformation from the first transformed domain to the first signal domain, and a post-processing in the first signal domain;

filtering the baseband mixture signal using the first adaptive filter to obtain a first output signal; and generating an estimation of the first source signal based on the first output signal.

24. The method of claim 23, wherein:

the additional signal comprises a mixture of a second source signal and a third signal;

the second source signal is generated by a second motion of a second object in the venue; and the received radio signal differs from the transmitted radio signal due to: the wireless channel, the first motion of the first object, and the second motion of the second object.

25. The method of claim 24, further comprising:

configuring a second adaptive filter for the baseband mixture signal based on the radio feature;

filtering the baseband mixture signal using the second adaptive filter to obtain a second output signal; and generating an estimation of the second source signal based on the second output signal.

* * * * *